(12) United States Patent
Takeda

(10) Patent No.: US 9,082,420 B2
(45) Date of Patent: Jul. 14, 2015

(54) OPTICAL DISC DEVICE AND FOCUS CONTROL METHOD THEREOF

(71) Applicant: Funai Electric Co., Ltd., Osaka (JP)

(72) Inventor: Futoshi Takeda, Suita (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 14/513,217

(22) Filed: Oct. 14, 2014

(65) Prior Publication Data

US 2015/0121404 A1    Apr. 30, 2015

(51) Int. Cl.
*G11B 7/09*    (2006.01)
*G11B 7/095*    (2006.01)

(52) U.S. Cl.
CPC ............ *G11B 7/0945* (2013.01); *G11B 7/0956* (2013.01)

(58) Field of Classification Search
None
See application file for complete search history.

(56) References Cited

U.S. PATENT DOCUMENTS

2008/0137499 A1    6/2008    Suzuki

FOREIGN PATENT DOCUMENTS

JP    2008-021356 A    1/2008
JP    2008-146714 A    6/2008

*Primary Examiner* — Wayne Young
*Assistant Examiner* — Brian Butcher
(74) *Attorney, Agent, or Firm* — Yokoi & Co., U.S.A.; Toshiyuki Yokoi

(57) ABSTRACT

The present invention aims for shortening a time required before the focus control is started. The initial focus position is detected, while the optical disc is not rotated, by making the objective lens approach to the optical disc from the first separation position farther from the optical disc than the focus position. The focus control is performed so that the objective lens tracks the focus position of the data recording layer, while the optical disc is rotated, by making the objective lens approach to the optical disc after the objective lens is returned to the second separation position farther from the optical disc than the first separation position. The initial focus position can be focus position of the data recording layer. The second separation position can be a position farther from the optical disc by a predetermined distance than the initial focus position.

11 Claims, 15 Drawing Sheets

OPTICAL DISC DEVICE AND FOCUS CONTROL METHOD THEREOF

CROSS-REFERENCES TO RELATED APPLICATIONS

This patent specification is based on Japanese patent application, No. 2013-226646 filed on Oct. 31, 2013 in the Japan Patent Office, the entire contents of which are incorporated by reference herein.

BACKGROUND OF THE INVENTION

1. Field of the Invention

The present invention relates to an optical disc device and a focus control method thereof.

2. Description of the Related Art

When an optical disc is rotated, "surface wobbling" may occur. The "surface wobbling" of the optical disc means that a light irradiation area is moved up and down by rotation of the optical disc.

An optical disc device disclosed in Patent document 1 has a laser, an objective lens, an actuator to drive the objective lens, a focal error detecting means, a spindle motor, a recording means, and a control means. The focal error detecting means detects a focal error of light condensed by the objective lens and outputs an S-shaped focus error signal. The recording means records a wobbling amount (degree of wobbling) when the optical disc is rotated by the spindle motor. The control means performs focus pull-in at a surface of the optical disc when a rotation speed of the optical disc is zero or low enough, and then the rotation speed of the optical disc is increased to record the wobbling amount and controls the actuator after adding the recorded wobbling amount.

An optical disc reproducing device disclosed in Patent document 2 has a light source, an objective lens, a drive means to move the objective lens in an approximately vertical direction with respect to the optical disc, a focus control means, a reproduction means, a recording means, and a control means. The focus control means performs a focus pull-in operation which is an operation of moving the objective lens in a predetermined range by the drive unit so that light from the light source is focused on the optical disc. When the reproduction of the optical disc is interrupted, the recording means records the maximum value and the minimum value of a drive voltage applied to the drive means for making the focus control means drive the objective lens at the time the reproduction is interrupted. When the reproduction of the optical disc is resumed, the control means calculates a frequency of surface wobbling of the optical disc from the maximum value and the minimum value of the drive voltage and the revolution speed of the optical disc at the resume point. The control means determines a drive frequency applied to the drive means based on the frequency of surface wobbling, and controls the focus control means to perform the focus pull-in operation. The drive frequency is corresponding to a moving speed of the objective lens in the focus pull-in operation.

Patent document 1: Japanese Patent Application Laid-Open No. 2008-146714

Patent document 2: Japanese Patent Application Laid-Open No. 2008-21356

BRIEF SUMMARY OF THE INVENTION

In the above described technologies, a focus control is performed so that the objective lens tracks the focus position of a data recording layer of the optical disc by one action of making the objective lens approach to the optical disc after the optical disc is rotated. In order to prevent the objective lens from being in contact with the optical disc, which is rotated and may cause the surface wobbling, the objective lens should be slowly approached to the optical disc from a position sufficiently separate from the optical disc.

With the foregoing in view, the present invention has a purpose to shorten a time required before the focus control is performed.

The optical disc device of the present invention has an embodiment of having:

a spindle motor that rotates an optical disc having a data recording layer;

an optical pickup that has an objective lens to focus a light beam on the optical disc;

an actuator that moves the objective lens in a focal direction approaching to the data recording layer and separating from the data recording layer;

an initial focus position detecting unit that detects an initial focus position, while the optical disc is not rotated, by making the objective lens approach to the optical disc from a first separation position, which is farther from the optical disc than a focus position; and a focus control unit that performs a focus control so that the objective lens tracks the focus position of the data recording layer, while the optical disc is rotated, by making the objective lens approach to the optical disc after the objective lens is returned to a second separation position, which is nearer to the optical disc than the first separation position.

In addition, a focus control method of the present invention has an embodiment of having the steps of:

detecting an initial focus position, while the optical disc is not rotated, by making the objective lens approach to the optical disc from a first separation position, which is farther from the optical disc than a focus position; and performing a focus control so that the objective lens tracks the focus position of the data recording layer, while the optical disc is rotated, by making the objective lens approach to the optical disc after the objective lens is returned to a second separation position, which is nearer to the optical disc than the first separation position.

According to the invention concerning claims 1 and 11, a time required before starting the focus control can be shortened.

According to the invention concerning claims 2 and 6, a preferable example for shortening a time required before performing the focus control can be provided.

According to the invention concerning claim 3, a preferable example of a process before the focus control can be provided.

According to the invention concerning claims 4 and 5, a time required before performing the focus control can be further shortened.

According to the invention concerning claims 7 to 9, a time required for the servo recovery can be shortened.

According to the invention concerning claim 10, a preferable example for the servo recovery processing can be provided.

DETAILED DESCRIPTION OF THE INVENTION

Hereafter, embodiments of the present invention will be described. Of course, the below-described embodiments merely exemplify the present invention.

(1) Outline of an Optical Disc Device 100 and a Focus Control Method Thereof

At first, with reference to FIGS. 1 to 14, an outline of an optical disc device 100 and a focus control method thereof will be explained.

Embodiment 1

Figure 1:
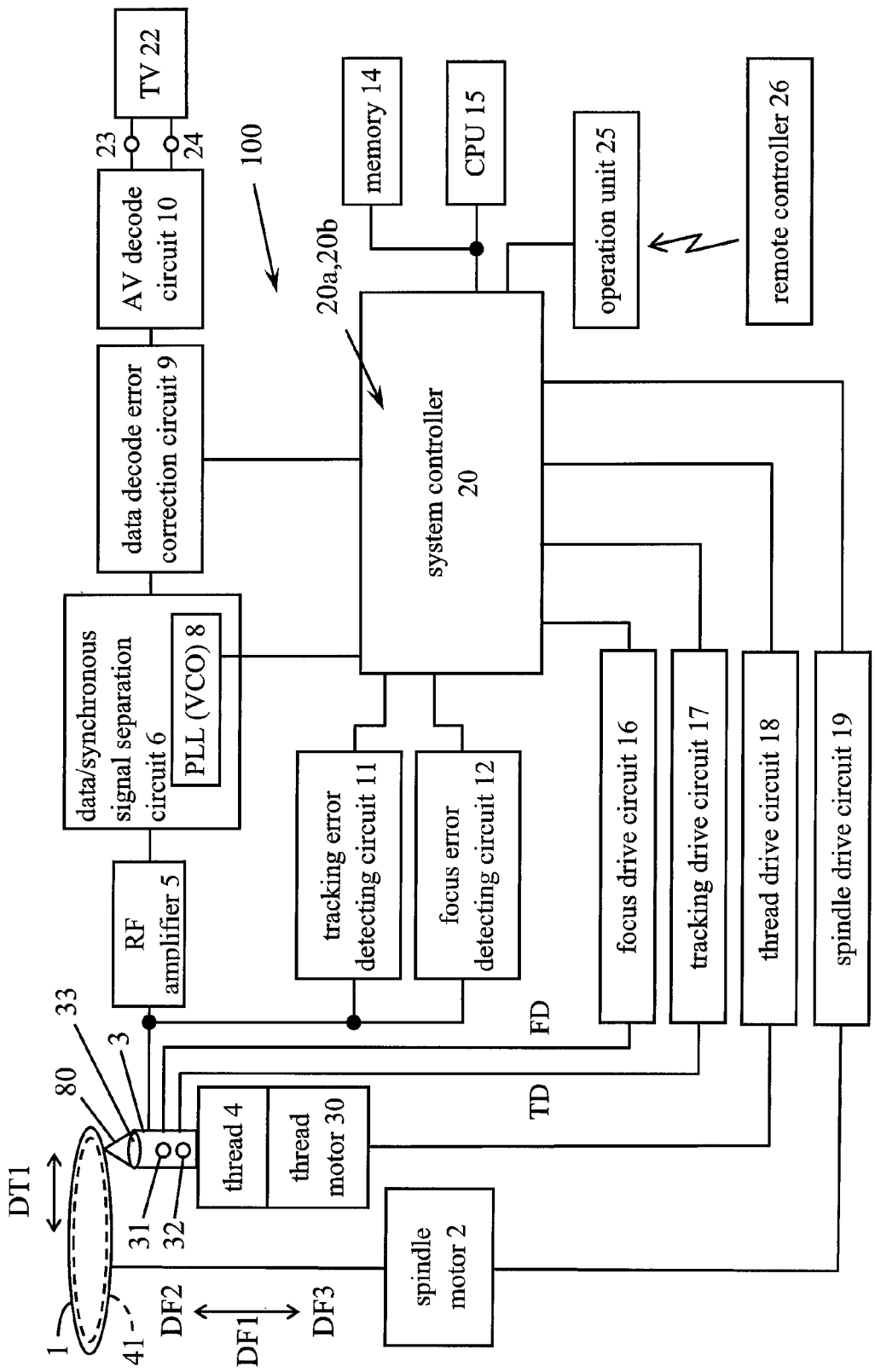
FIG. 1 is a block diagram showing a configuration example of an optical disc device 100.
Figure 2:
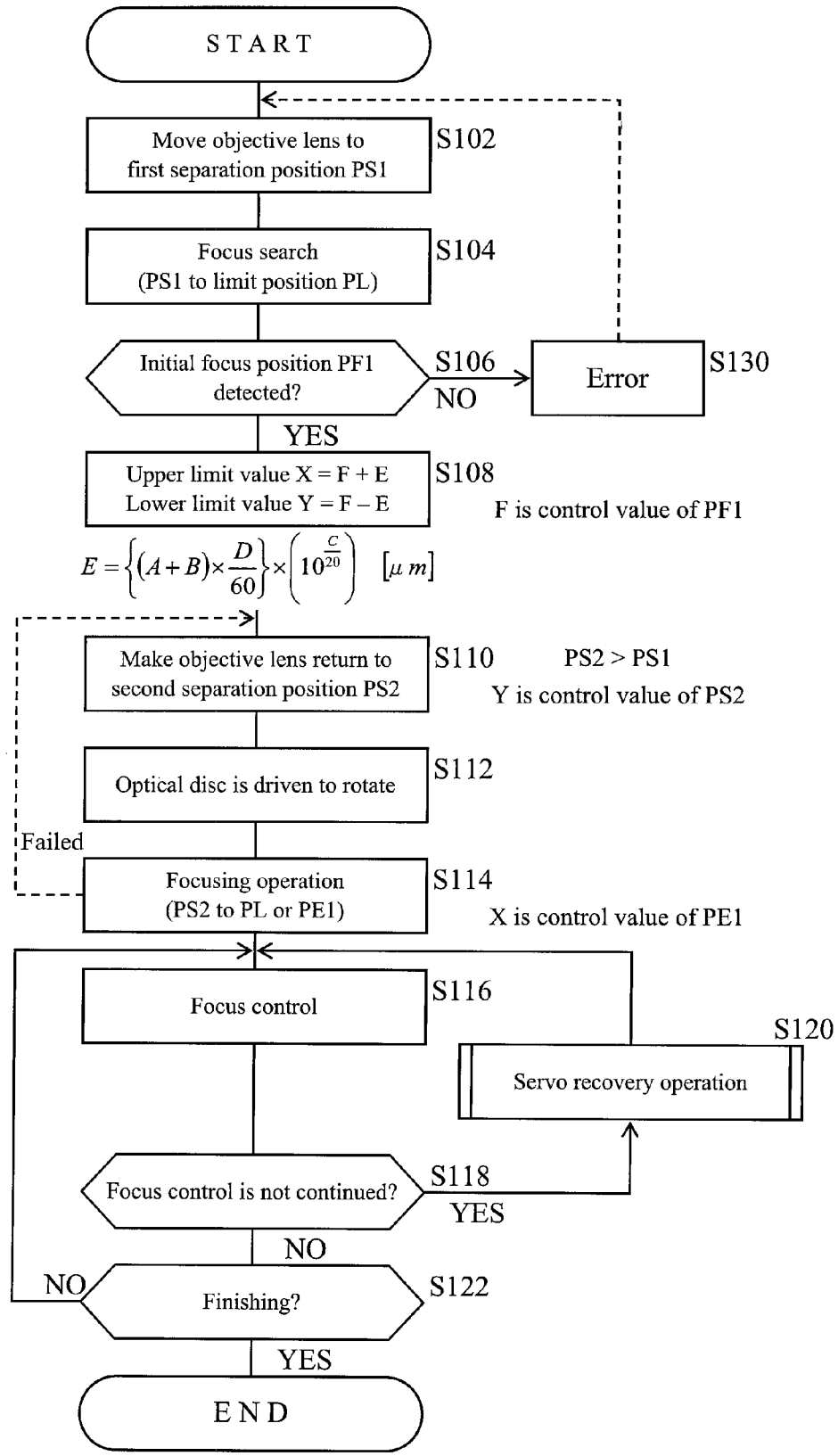
FIG. 2 is a flow chart showing the first example of a process of a control unit (20).

Shown in FIGS. 1 to 3

The optical disc device 100 has a spindle motor 2, an optical pickup 3, an actuator 31, an initial focus position detecting unit 20a, and a focus control unit 20b. The spindle motor 2 rotates an optical disc 1 on which a data recording layer 41 is formed. The optical pickup 3 has an objective lens 33 which focuses a light beam 80 on the optical disc 1. The actuator 31 moves the objective lens 33 in a focal direction DF1, which is a direction of making the objective lens 33 approach to or separate from the data recording layer 41. The initial focus position detecting unit 20a detects an initial focus position PF1, while the optical disc 1 is not rotated, by making the objective lens 33 approach to the optical disc 1 from a first separation position PS1, which is farther from the optical disc 1 than a focus position. The focus control unit 20b performs a focus control (S116) so that the objective lens 33 tracks the focus position of the data recording layer 41, while the optical disc 1 is rotated, by making the objective lens 33 approach to the optical disc 1 after the objective lens 33 is returned to a second separation position PS2, which is nearer to the optical disc 1 than the first separation position PS1.

The initial focus position PF1 is easily detected because it is detected while the optical disc 1 is not rotated. Since the objective lens 33 approaches the optical disc 1, while the optical disc 1 is rotated, after the objective lens 33 is returned to a second separation position PS2, which is nearer to the optical disc 1 than the first separation position PS1, a time required before the focus control (S116), which is an operation for making the objective lens 33 track the focus position of the data recording layer 41, is started can be shortened.

Note that the optical disc 1 can be a BD (Blu-ray disc), a DVD (Digital Versatile Disc), or a CD (Compact Disc), for example. The optical disc device 100 can be an optical disc recording/reproducing device capable of recording and reproducing the optical disc, an optical disc reproducing device capable of only reproducing the optical disc, or an optical disc device integrated with other devices such as a display device, for example.

Embodiment 2

Shown in FIGS. 1 to 3

The initial focus position PF1 can be the focus position of the data recording layer 41. The second separation position PS2 can be a position farther from the optical disc 1 by a predetermined distance E than the initial focus position PF1. The present embodiment can provide a preferable example to shorten the time required before the focus control (S116) is started.

Embodiment 3

Shown in FIGS. 1 to 3

When the focus control unit 20b cannot perform the focus control (S116) so that the objective lens 33 tracks the focus position of the data recording layer 41, while the optical disc 1 is rotated, by making the objective lens 33 approach to the optical disc 1 after the objective lens 33 is returned to the second separation position PS2 and the objective lens 33 reaches a position nearer to the optical disc 1 by the predetermined distance E than the initial focus position PF1, the focus control unit 20b can perform the focus control (S116) by making the objective lens 33 approach to the optical disc 1 after the objective lens 33 is returned to a position farther from the optical disc 1 than the initial focus position PF1. The present embodiment can provide a preferable example of a process before performing the focus control (S116).

Embodiment 4

Figure 4:
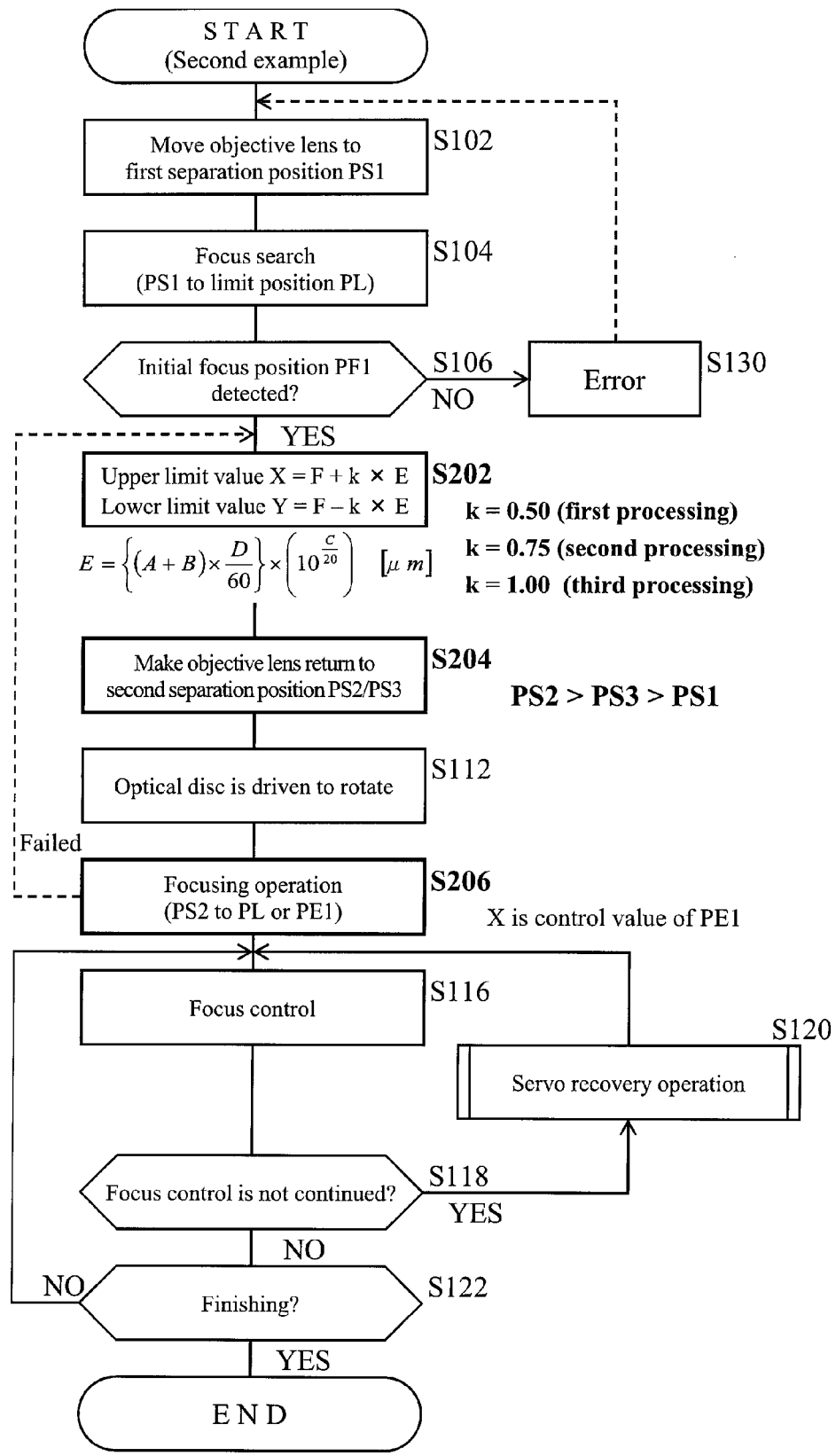
FIG. 4 is a flow chart showing the second example of the process of the control unit (20).

Shown in FIGS. 4 and 5

When the focus control unit 20b cannot perform the focus control (S116), while the optical disc 1 is rotated, by making the objective lens 33 approach to the optical disc 1 after the objective lens 33 is returned to the second separation position PS2, the focus control unit 20b can perform the focus control (S116) so that the objective lens 33 tracks the focus position of the data recording layer 41 by making the objective lens 33 approach to the optical disc 1 after the objective lens 33 is returned to a third separation position PS3, which is farther from the optical disc 1 than the second separation position PS2 and nearer than the first separation position PS1. The present embodiment can further shorten the time required before performing the focus control (S116).

Embodiment 5

Figure 6:
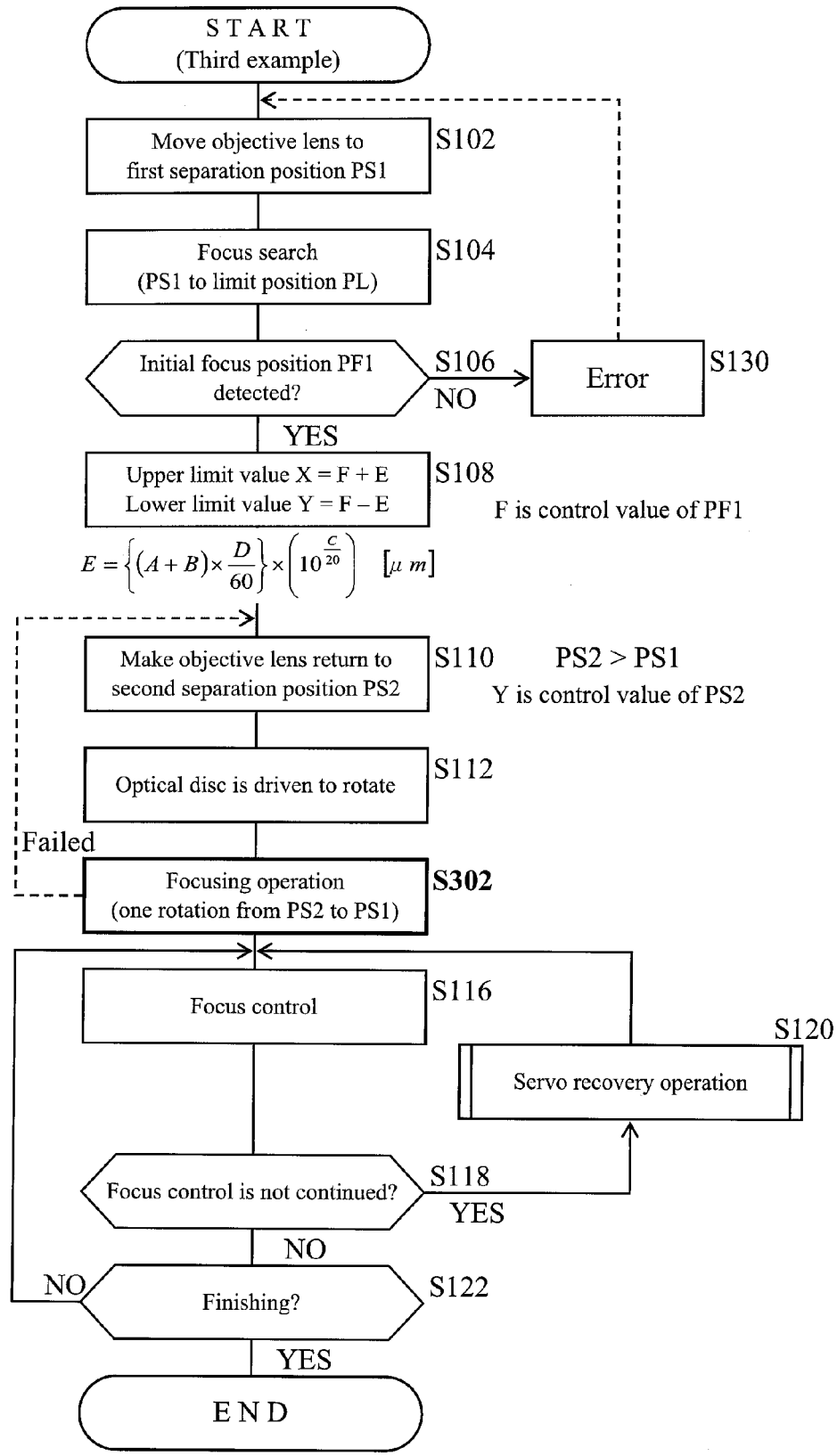
FIG. 6 is a flow chart showing the third example of the process of the control unit (20).

Shown in FIG. 6

When the focus control unit 20b cannot perform the focus control (S116), while the optical disc 1 is rotated, by making the objective lens 33 approach to the optical disc 1 after the objective lens 33 is returned to the second separation position PS2 and the objective lens 33 reaches a position nearer to the optical disc 1 than the initial focus position PF1 by a distance equal to or more than one rotation of the optical disc 1, the focus control unit 20b can perform the focus control (S116) so that the objective lens 33 tracks the focus position of the data recording layer 41 by making the objective lens 33 approach to the optical disc 1 after the objective lens 33 is returned to a position farther from the optical disc 1 than the initial focus position PF1. The present embodiment also can further shorten the time required before performing the focus control (S116).

Embodiment 6

Figure 7:
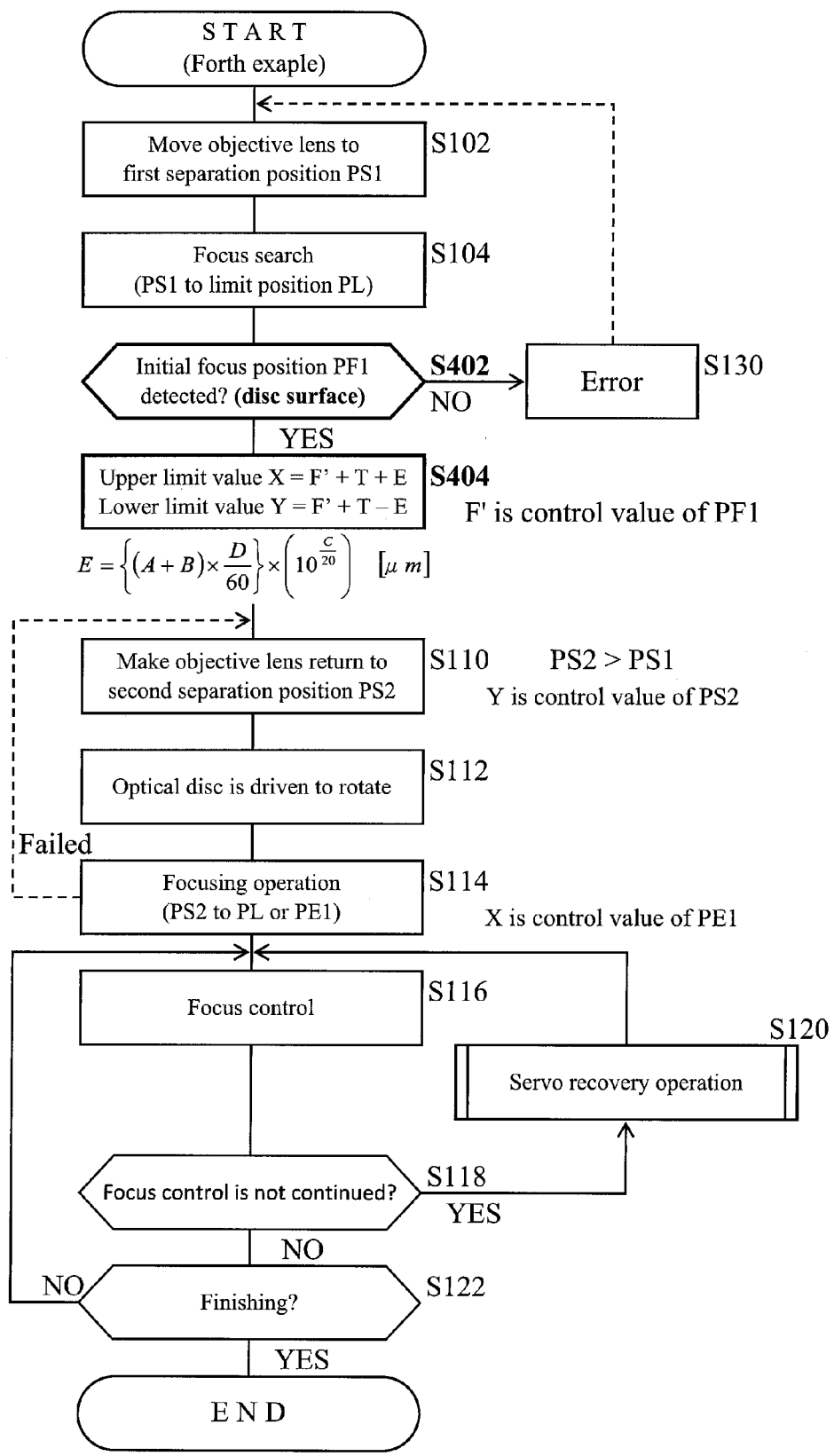
FIG. 7 is a flow chart showing the fourth example of the process of the control unit (20).

Shown in FIGS. 7 and 8

The initial focus position PF1 can be a focus position of the disc surface 48 of the optical disc 1. When a depth of the data recording layer 41 from the disc surface of the optical disc 1 is defined as "T", the focus control unit 20b can perform the focus control (S116), while the optical disc 1 is rotated, by making the objective lens 33 approach to the optical disc 1 after the objective lens 33 is returned to the second separation position, which is farther from the optical disc 1 than a calculated focus position (F'+T). The calculated focus position (F'+T) is nearer by the depth T to the optical disc 1 than the initial focus position PF1. The present embodiment can provide a preferable example to shorten the time required before the focus control (S116) is started. In particular, the present embodiment is preferable when the focus control (S116) is performed on the optical disc 1 having a plurality of data recording layers 41.

Embodiment 7

Figure 9:
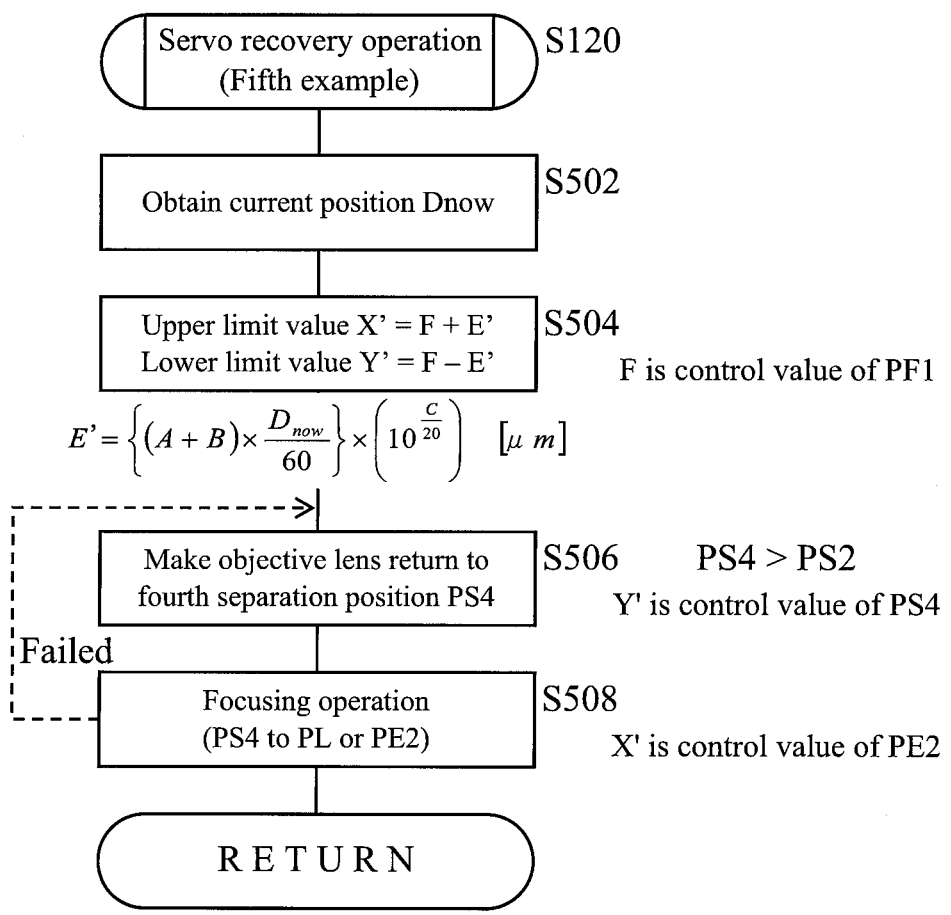
FIG. 9 is a flow chart showing the fifth example of the process of the control unit (20).

Shown in FIGS. 9 and 10

When the focus control unit 20b cannot perform the focus control in the middle of rotating the optical disc 1, the focus control unit 20b can perform the focus control (S116) so that the objective lens 33 tracks the focus position of the data recording layer 41 by making the objective lens 33 approach to the optical disc 1 after the objective lens 33 is returned to a position PS4, which is nearer to the optical disc 1 than the second separation position PS2 and determined according to a ratio of Dnow/Dmax. The ratio of Dnow/Dmax is a ratio of a current position Dnow to an outermost peripheral position Dmax of the optical pickup 3 in a radial direction DT1 of the optical disc 1. The present embodiment can shorten a time required for servo recovery.

Embodiment 8

Figure 11:
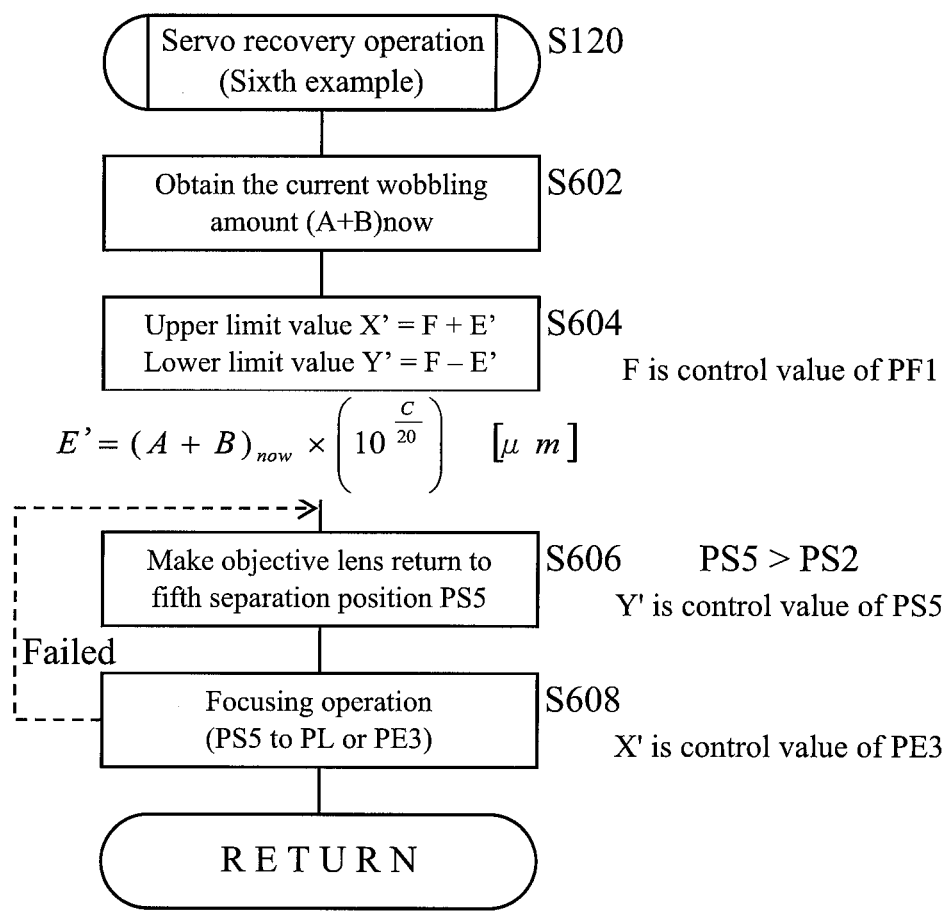
FIG. 11 is a flow chart showing the sixth example of the process of the control unit (20).

Shown in FIG. 11

The focus control unit 20b can obtain a wobbling amount (A+B)now of the optical disc 1 at a current position Dnow of the optical pickup 3 in the radial direction DT1 of the optical disc 1. In such a case, when the focus control cannot be performed in the middle of rotating the optical disc 1, the focus control unit 20b can perform the focus control (S116) so that the objective lens 33 tracks the focus position of the data recording layer 41 by making the objective lens 33 approach to the optical disc 1 after the objective lens 33 is returned to a position PS5, which is determined according to the wobbling amount (A+B)now. The present embodiment can also shorten a time required for servo recovery.

Embodiment 9

Figure 12:
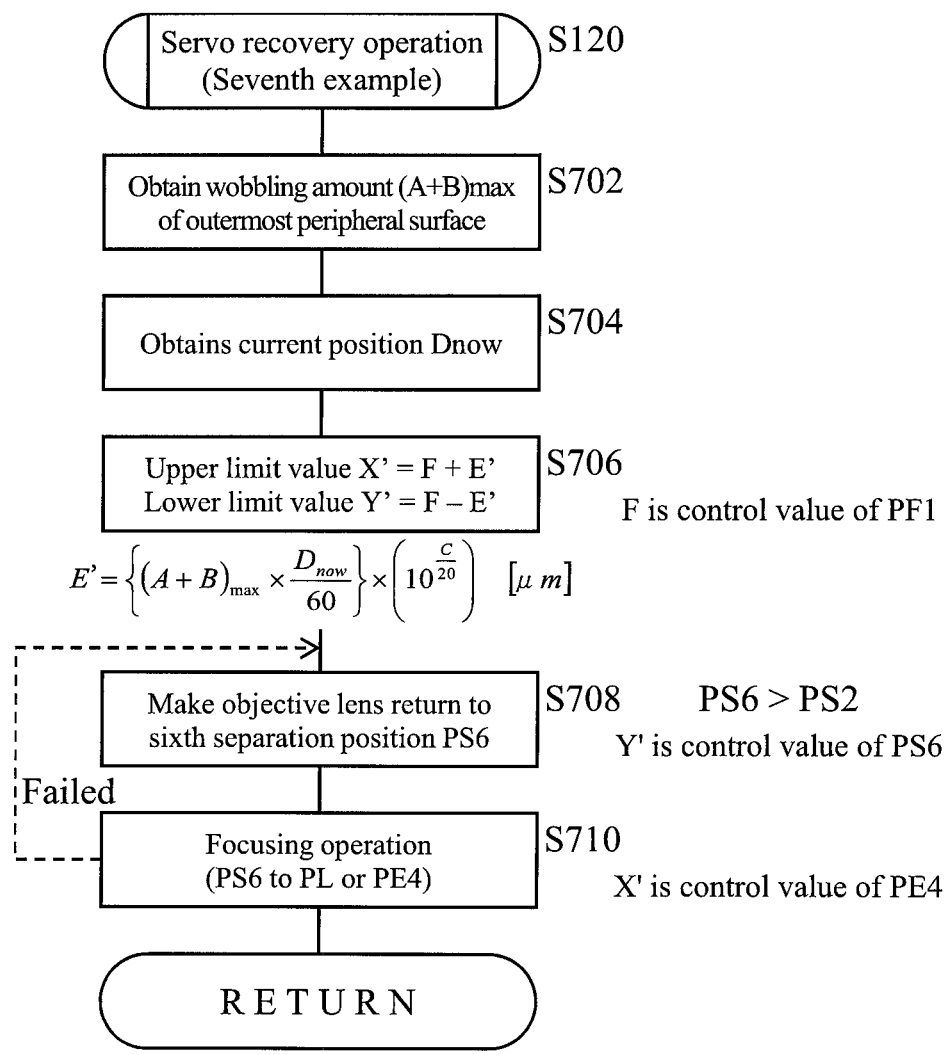
FIG. 12 is a flow chart showing the seventh example of the process of the control unit (20).
Figure 14:
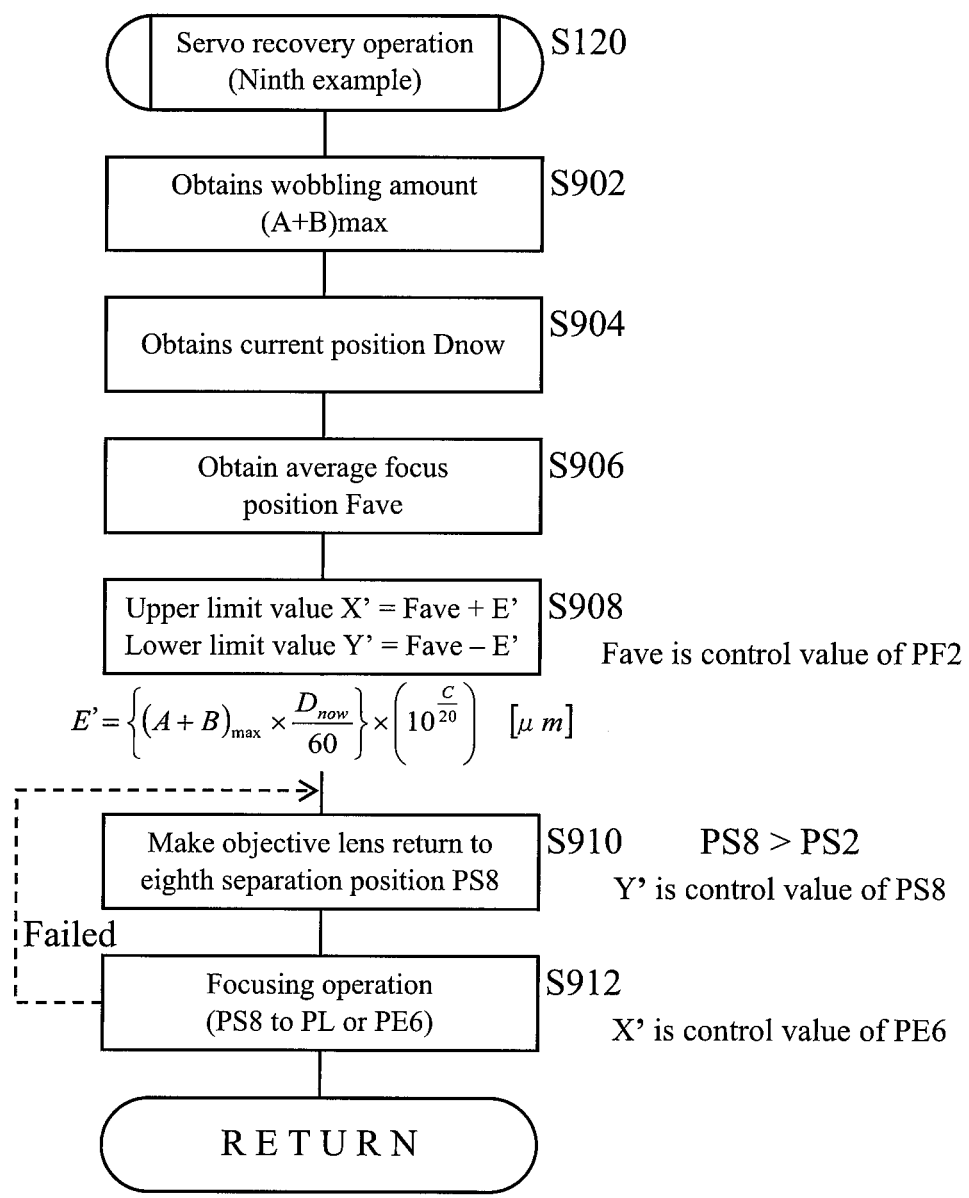
FIG. 14 is a flow chart showing the ninth example of the process of the control unit (20).

Shown in FIGS. 12 and 14

The focus control unit 20b can obtain a wobbling amount (A+B)max of the optical disc 1 at an outermost peripheral position of the optical pickup 3. In such a case, when the focus control cannot be performed in the middle of rotating the optical disc 1, the focus control unit 20b can perform the focus control (S116) so that the objective lens 33 tracks the focus position of the data recording layer 41 by making the objective lens 33 approach to the optical disc 1 after the objective lens 33 is returned to a position PS6. The position PS6 is determined according to a multiplication value between the ratio of Dnow/Dmax and the wobbling amount (A+B)max. The ratio of Dnow/Dmax is a ratio of a current position Dnow to an outermost peripheral position Dmax of the optical pickup 3 in a radial direction DT1 of the optical disc 1. The present embodiment can also shorten a time required for servo recovery.

Embodiment 10

Figure 13:
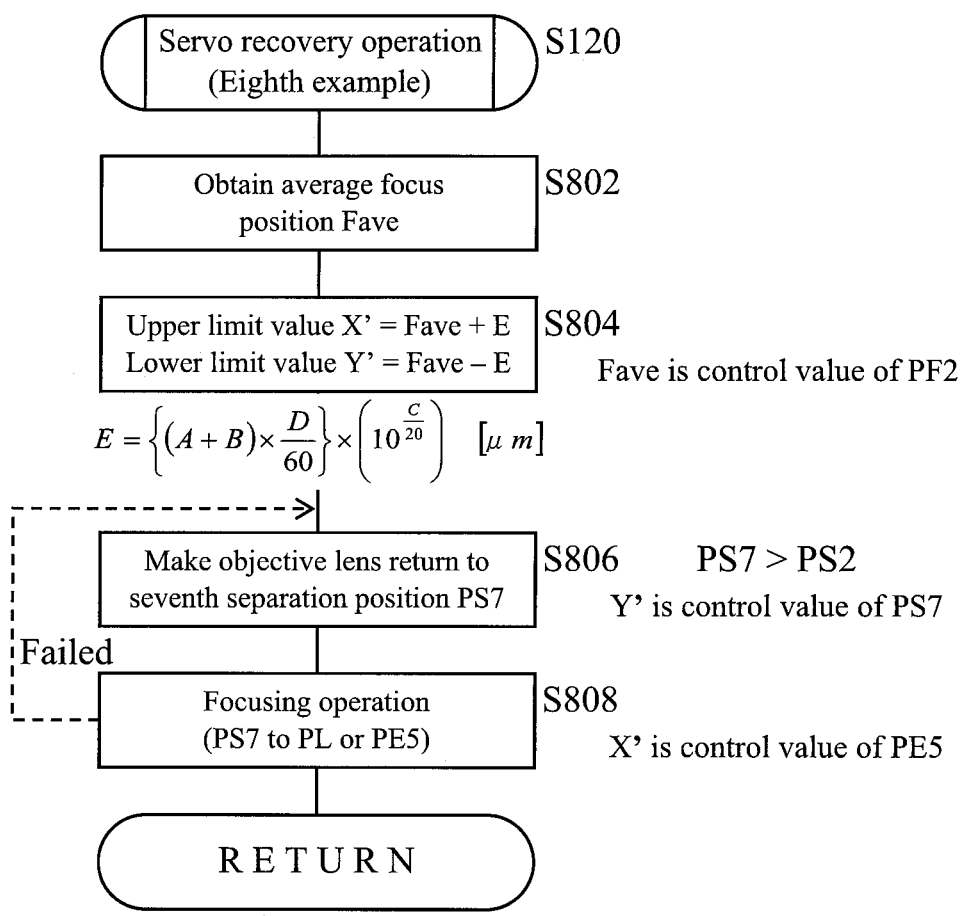
FIG. 13 is a flow chart showing the eighth example of the process of the control unit (20).

Shown in FIGS. 13 and 14

The focus control unit 20b can obtain an average focus position Fave of the data recording layer 41 during the focus control (S116). In such a case, when the focus control cannot be performed in the middle of rotating the optical disc 1, the focus control unit 20b can perform the focus control (S116) so that the objective lens 33 tracks the focus position of the data recording layer 41 by making the objective lens 33 approach to the optical disc 1 after the objective lens 33 is returned to a position PS7, which is farther from the optical disc 1 by the predetermined distance E than the average focus position Fave. The present embodiment can provide a preferable example of a servo recovery operation (S120).

Embodiment 11

An embodiment of a method for performing the focus control (S116) described in one of the embodiments 1 to 10 can provide the same effects.

(2) Explanation of the Optical Disc Device and Focus Control Method Thereof

An optical disc device 100 shown in FIG. 1 has an optical pickup (OPU) 3, a thread 4, servo motors 2, 30, drive circuits 16 to 19, an RF (Radio Frequency) amplifier 5, a data/synchronous signal separation circuit 6, a data decode error correction circuit 9, an AV (Audio/Video) decode circuit 10, error detecting circuits 11, 12, an operation unit 25, and a system controller (control unit) 20, for example.

The optical pickup 3 has an objective lens 33 that focus a laser beam (light beam 80) on the optical disc 1. The optical pickup 3 emits a laser beam and receives a reflecting light from the optical disc 1 so as to reproduce information recorded on the optical disc 1 and records information on the optical disc 1. The optical pickup 3 has actuators 31, 32. A focus actuator 31 performs a focus servo which is an operation of moving an objective lens 33 in a focal direction DF1 approximately perpendicular to a planar data recording layer 41 of the optical disc 1. The focal direction DF1 is a direction of making the objective lens 33 approach to or separate from the data recording layer 41. The focal direction DF1 is not limited to a direction strictly perpendicular to the data recording layer 41. Here, a direction of making the objective lens 33 approach to the data recording layer 41 is defined as an approach direction DF2, and a direction of making the objective lens 33 separate from the data recording layer 41 is defined as a separation direction DF3. A tracking actuator 32 performs a tracking servo, which is an operation of moving the objective lens 33a in a radial direction (tracking direction) approximately parallel to the data recording layer 41. The radial direction DT1 is a direction of making the objective lens 33 approach to or separate from a rotation axis of the optical disc 1 along the planar data recording layer 41. The radial direction DT1 is not limited to a direction strictly parallel to the data recording layer 41. The spindle motor 2 rotates the optical disc 1 having the data recording layer 41 in a predetermined rotation direction. A spindle drive circuit 19 drives the spindle motor 2. A focus drive circuit 16 drives the focus actuator 31. A tracking drive circuit 17 drives the tracking actuator 32. A thread motor 30 moves the thread 4 on which the optical pickup 3 is mounted in the radial direction DT 1 of the optical disc 1. A thread drive circuit 18 drives the thread motor 30.

A lens holder on which the objective lens 33 of the optical pickup 3 is mounted is movably supported by the focus actuator 31 so as to be moved in the focal direction DF1 with respect to the thread 4. The focus actuator 31 shifts the lens holder in the tracking direction (DT1) by a focus drive voltage (FD) supplied from the focus drive circuit 16. In addition, the lens holder is movably supported by the tracking actuator 32 so as to be moved in the radial direction DT1 of the optical disc 1 with respect to the thread 4. The tracking actuator 32 shifts the lens holder in the tracking direction (DT1) by a tracking drive voltage (TD) supplied from the tracking drive circuit 17.

When the optical disc 1 is reproduced, the RF amplifier 5 inputs a reproduction signal (read signal) from the optical pickup 3 and amplifies the reproduction signal so as to produce an RF signal. The data/synchronous signal separation circuit 6 has a PLL (Phase Locked Loop) 8, which includes a VCO (Voltage Controlled Oscillator). The data/synchronous signal separation circuit 6 inputs the RF signal from the RF amplifier 5 and separates the RF signal into a data and a synchronous signal. The data decode error correction circuit 9 inputs the data separated by the data/synchronous signal separation circuit 6, checks an error by decoding the data, and corrects the error to output a correct data if there is any error on the data. An AV decode circuit 10 inputs the correct data from the data decode error correction circuit 9, decodes the data, and outputs a video signal and an audio signal. The video signal is supplied to external devices such as a television receiver (TV) 22 via a video output terminal 23. The audio signal is supplied to external devices such as the TV 22 via an audio output terminal 24.

The operation unit 25 and a remote controller 26 have a plurality of keys to perform various operations such as a power on-off operation of the optical disc device 100 and a reproduction operation. The operation unit 25 has a light receiving means to receive an optical signal indicating an operation command from the remote controller 26. The operation unit 25 converts the optical signal into an electrical signal by the light receiving means and outputs a command signal to the system controller 20. The operation unit 25 is provided on a front surface of a body of the optical disc device 100, for example.

A tracking error detecting circuit 11 detects a tracking error (TE) signal included in the reproduction signal inputted from the optical pickup 3. A focus error detecting circuit 12 detects a focus error (FE) signal included in the reproduction signal inputted from the optical pickup 3. For the error detecting circuits 11, 12, the error detecting circuits disclosed in Japanese Patent Application Laid-Open No. 2008-257765 can be used, for example.

The system controller (control unit) 20 controls above described components according to a CPU (Central Processing Unit) 15. The CPU 15 performs processing of whole the optical disc device in accordance with programs and information recorded in a memory 14. For example, the system controller 20 controls the focus servo of the optical pickup 3 based on the FE signal included in the reproduction signal inputted from the optical pickup 3, and controls the tracking servo of the optical pickup 3 based on the TE signal included in the reproduction signal. In addition, the system controller 20 controls the optical pickup 3 to move in the radial direction DT1 of the optical disc 1 by driving the thread 4 via the thread drive circuit 18, and controls the optical disc 1 to rotate by driving the spindle motor 2 via the spindle drive circuit 19. Note that the system controller 20 includes the initial focus position detecting unit 20a and the focus control unit 20b.

Figure 3A:
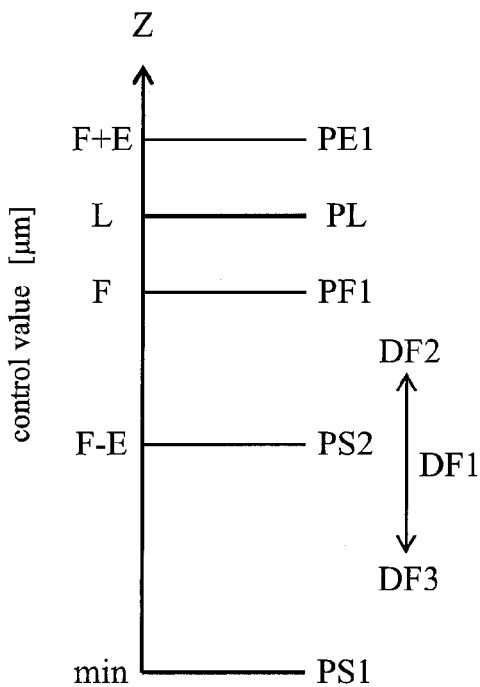
FIGS. 3A and 3B are drawings showing an example of a relation of control positions.
Figure 3B:
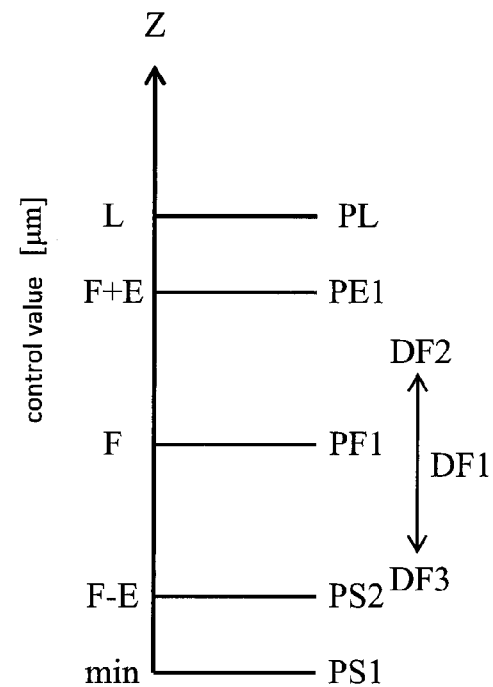
Figure 3C:
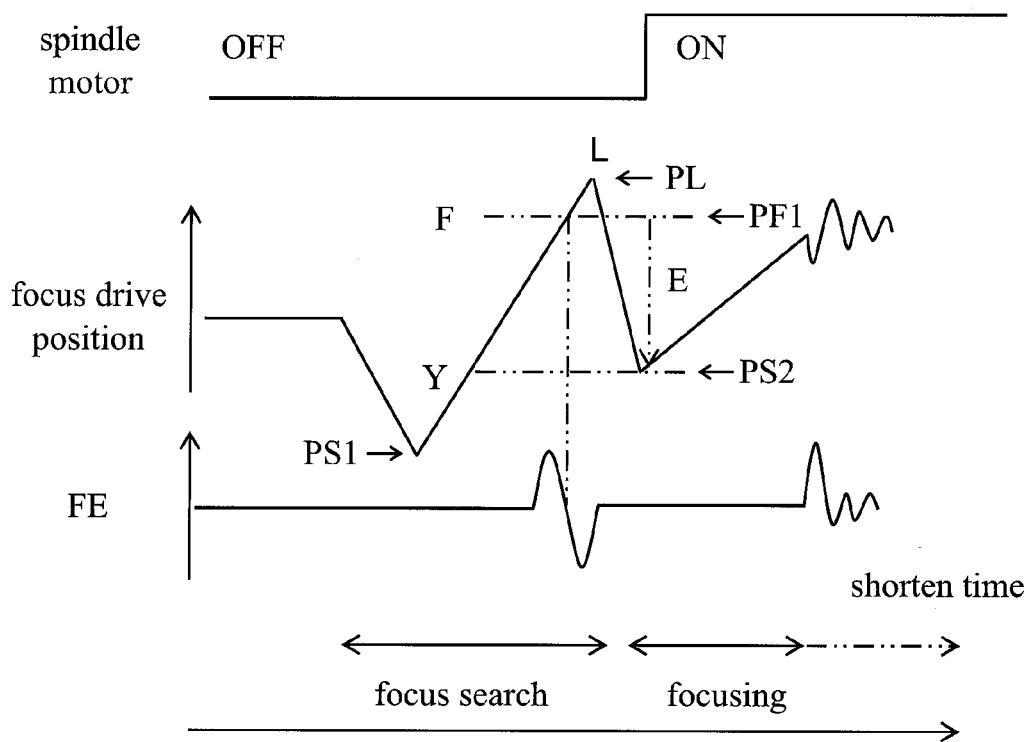
FIG. 3C is a timing chart showing an operation example of the optical disc device 100.

FIG. 3C shows a timing chart of on/off of rotation driving of the spindle motor 2, a drive position of the objective lens 33 driven by the focus actuator 31, and the focus error (FE) signal. Here, a horizontal axis shows a time, a vertical axis of "focus drive position" shows a position of the objective lens 33 in the focal direction DF1, and a vertical axis of "FE" shows vibration amplitude of the FE signal. When the objective lens 33 is farther from the data recording layer 41 than the focus position, the vibration amplitude of the FE signal is 0. When the objective lens 33 is approached to the data recording layer 41, the FE signal vibrates forming S-shape within a certain range with the focus position as a center. A zero-crossing point of an S-shaped curve is the focus position. As shown in FIGS. 2 and 3, the system controller 20 of the present technology detects the initial focus position PF1 by making the objective lens 33 approach to the optical disc 1, while the optical disc 1 is not rotated, from the first separation position PS1, which is farther from the optical disc 1 than the focus position. Then, the system controller 20 performs the focus control (S116) so that the objective lens 33 tracks the focus position of the data recording layer 41, while the optical disc 1 is rotated, by making the objective lens 33 approach to the optical disc 1 after the objective lens 33 is returned to the second separation position PS2, which is nearer to the optical disc 1 than the first separation position PS1.

(3) First Example

FIG. 2 shows the first example of a process of the system controller 20. The process is started, for example, when the optical disc 1 is installed on the optical disc device 100, and executed in parallel with other processes by time-division processing (multitasking) or timer interruption. The above explanation is also applied to the second and later examples.

Note that the steps S102 to S106 are corresponding to the initial focus position detecting unit 20$a$, and the steps S108 to S122 are corresponding to the focus control unit 20$b$. The above explanation is also applied to the second and later examples. Hereafter, the description of "step" will be omitted.

When the process is started, the system controller 20 drives the focus actuator 31 so as to move the objective lens 33 to the first separation position PS1, which is farther from the optical disc 1 than the focus position, while the optical disc 1 is not rotated (S102). The first separation position PS1 is a position of the objective lens 33 farthest from the optical disc 1 within a moving range of a focus search according to a kind of optical disk (media). In an example of FIG. 3A, a control value: Z=min, which is corresponding to the first separation position PS1, is given to the focus drive circuit 16.

In S104, while the optical disc 1 is not rotated, the focus search is performed by driving the focus actuator 31 to make the objective lens 33 approach to the optical disc 1 from the first separation position PS1 to a limit position PL so as to detect the initial focus position PF1. The limit position PL is a position of the objective lens 33 nearest to the optical disc 1 within the moving range of the focus search. The optical disc device 100 has a disc collision prevention function to move the objective lens 33 in the separation direction DF3 when the objective lens 33 reaches the limit position PL. The initial focus position PF1 shown in FIG. 3C is the focus position of the data recording layer 41 and the zero-crossing point of the S-shaped curve of the maximum vibration amplitude of the FE signal.

In S106, whether the initial focus position PF1 is detected or not is judged. If the initial focus position is not detected, the system controller 20, for example, outputs an error (S130) and returns to S102. In other words, detection of the initial focus position is repeated. If the initial focus position PF1 is detected, the system controller 20 calculates an upper limit value X, which is a control value corresponding to a first end position PE1, and a lower limit value Y, which is a control value corresponding to the second separation position PS2 (S108). The values X, Y are determined based on product design parameters.

For example, a case is considered where the following design parameters are defined. Note that a unit of the surface wobbling may be referred to merely as [μm].

standard of mechanism surface wobbling=A [μmpp]
standard of disc surface wobbling=B [μmpp] (target value)
gain variation level in sensitivity and circuit=±C [dB]
maximum rezero position=D [mm]

The "mechanical surface wobbling" means a surface wobbling caused by mechanical devices such as an inclination of a turntable on which the optical disc is put. The "disc surface wobbling" means a surface wobbling caused by the optical disc. A unit "μmpp" of the surface wobbling means a distance between the maximum position and the minimum position in the focal direction in micron units. If the "gain variation level in sensitivity and circuit" becomes larger by 6 dB, "gain variation in sensitivity and circuit" becomes almost doubled. The "maximum rezero position" means an outermost peripheral position of the optical pickup in the radial direction of the optical disc.

A maximum surface wobbling value E at the maximum rezero position is shown by the following formula.

$$E=[(A+B)\times(D/60)]\times10(C/20) \,[\mu m] \tag{1}$$

If the detected value of the initial focus position PF1 is F μm when the focus search is performed, the values X, Y for the focusing operation can be determined by the following formula.

$$\text{Upper limit value } X=F+E \,[\mu m] \tag{2}$$

$$\text{Lower limit value } Y=F-E \,[\mu m] \tag{3}$$

The upper limit value X is specified in preparation for when the focusing is failed.

For example, in a case when A=50, B=1000, C=3.0, and D=30, the following values can be calculated from the formula (1) to (3).

Maximum surface wobbling value E=742 [μm]
Upper limit value X=1242 [μm]
Lower limit value Y=−242 [μm]

The second separation position PS2, which is corresponding to the lower limit value Y, is a position specified by considering the design parameters of other than the media, and therefore the second separation position PS2 is nearer to the optical disc 1 than the first separation position PS1, which is specified without considering the design parameters of other than the media. Therefore, the following relation is satisfied.

$$Y>\min$$

In addition, the second separation position PS2 is a position based on the initial focus position PF1, which is changed by the inclination of the optical disc 1 or other conditions, and therefore the second separation position PS2 is farther from the optical disc 1 by a predetermined distance E than the initial focus position PF1. Therefore, the end position PE1, which is corresponding to the upper limit value X=F+E, may be nearer to the optical disc 1 than the limit position PL as shown in FIG. 3A, and may be farther from the optical disc 1 than the limit position PL as shown in FIG. 3B.

The end position PE1 is nearer to the optical disc 1 than the initial focus position PF1 by the predetermined distance E.

After the values X, Y for the focusing operation are calculated, the system controller 20 drives the focus actuator 31 to make the objective lens 33 return to the second separation position PS2 (control value: Y=F−E), which is nearer to the optical disc 1 than the first separation position PS1 (control value: min) (S110). In S112, the spindle motor 2 is driven to rotate the optical disc 1. In S114, while the optical disc 1 is rotated, the system controller 20 tries the focus control by driving the focus actuator 31 to make the objective lens 33 approach to the optical disc 1 from the second separation position PS2. When the objective lens 33 cannot track the focus position of the data recording layer 41 and the objective lens 33 reaches the limit position PL or the end position PE1, the system controller 20 determines that the focusing is failed and then performs a retry operation by, for example, returning to S110. Since the objective lens 33 is specified not exceeding either of the limit position PL and the end position PE1, although the end position PE1 corresponding to the upper limit value X=F+E can become nearer to the optical disc 1 than the limit position PL, the objective lens 33 cannot be approached to the optical disc 1 exceeding the limit position PL. If the limit position PL is farther from the optical disc 1 than the end portion PE1, the system controller 20 returns to S110 when the objective lens 33 reaches the limit position PL. If the end portion PE1 is farther from the optical disc 1 than the limit position PL, the system controller 20 returns to S110 when the objective lens 33 reaches the end position PE1.

If the focusing succeeds, the system controller 20 continues to perform the focus control (S116). Since the focus control may not be continued in some cases, whether the focus control is continued or not is judged in S118. If the focus control is not continued, the system controller 20 performs a servo recovery operation (S120) and returns to S116. The servo recovery operation can be performed in the same manner as a focusing operation of S114, for example. If the focus control is continued, the system controller 20 judges whether a condition of finishing the focus control is satisfied or not (S122). For example, when there is no data to be read, the condition is satisfied. When the condition is not satisfied, the system controller 20 returns to S116. When the condition is satisfied, the system controller 20 finishes the processing.

Figure 15:
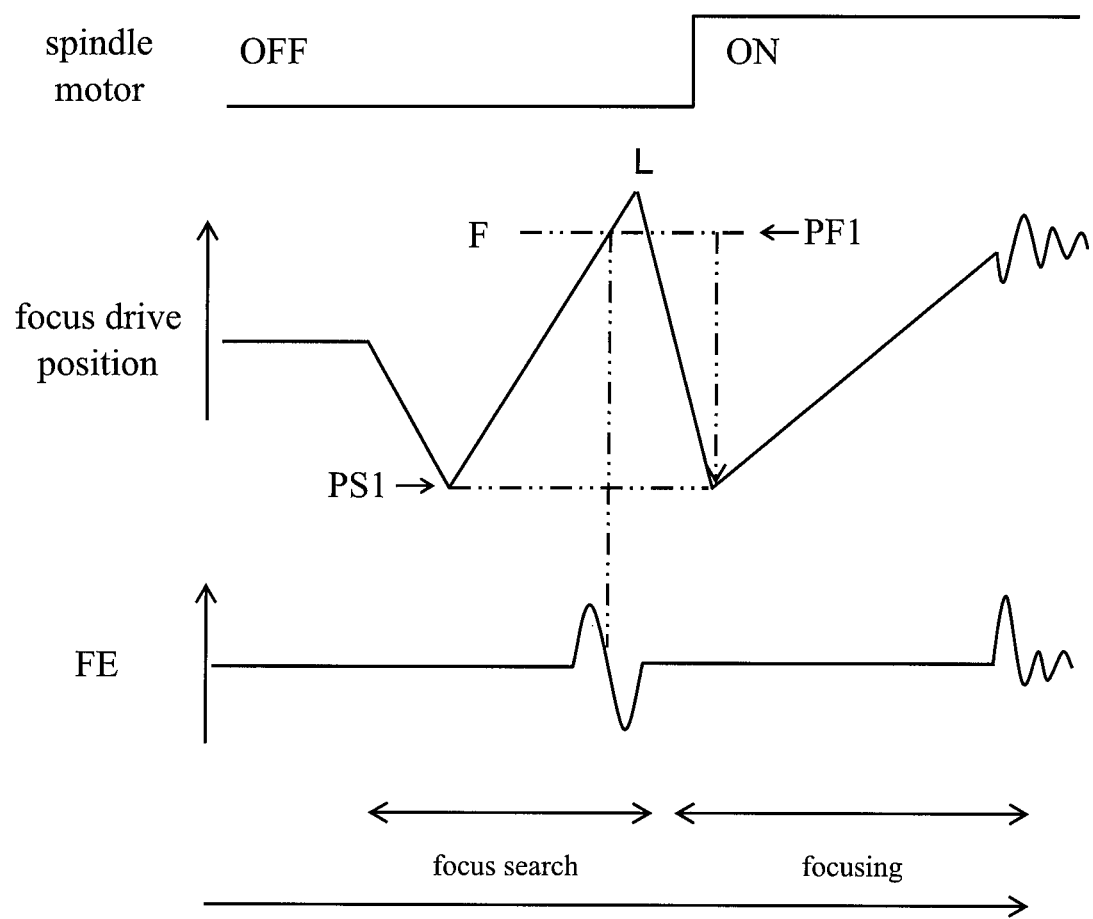
FIG. 15 is a timing chart showing a reference example of an operation of the optical disc device.

Here, the present invention is compared with an example shown in FIG. 15 where a separation position (lower limit value) when starting the focusing is fixed according to the media. In the example of FIG. 15, the separation position when starting the focusing is equal to the separation position PS1 when starting the focus search. Therefore, a distance from the separation position PS1 to the initial focus position PF1 is long. Consequently, the focusing can be performed even for the optical disc device having the maximum surface wobbling caused by the mechanical device such as a height variation of mechanism and even for the optical disc device having the maximum gain variation in sensitivity and circuit. However, in the optical disc device having less surface wobbling caused by the mechanical device and the optical disc device having less gain variation in sensitivity and circuit, much waste time is required before performing the focus control.

On the other hand, in the example shown in FIG. 3C, the second separation position PS2 when starting the focusing is nearer to the optical disc 1 than the first separation position PS1 when starting the focus search. Therefore, a distance from the second separation position PS2 to the initial focus position PF1 is short. Consequently, a time required before performing the focus control is shortened. Since the focusing is started after the objective lens 33 is returned to the second separation position PS2, which is lower than the initial focus position PF1 by the predetermined distance E, the focusing can be started from an optimal position considering the surface wobbling caused by the mechanical device such as a height variation of mechanism and the gain variation in sensitivity and circuit at the minimum level. In particular, this is more effective for the optical disc device having less surface wobbling caused by the mechanical device and the optical disc device having less gain variation in sensitivity and circuit. Note that the upper limit value X and the lower limit value Y can be limited within a range of a movable range of the optical pickup or a range not exceeding an allowable current.

(4) Second Example

Although the upper limit value X and the lower limit value Y are determined by completely considering the product design parameters in the first example, it is assumed that the surface wobbling and the sensitivity variation are a little smaller. Therefore, in the second example, the parameters are not completely considered when performing the first focusing. Instead, the upper limit value X and the lower limit value Y are calculated considering the surface wobbling and the sensitivity variation are about half of the parameters and then the focusing is performed. After that, if the focus control cannot be performed, the upper limit value X and the lower limit value are calculated again by increasing a ratio of the parameters to be considered so as to retry the focusing.

Figure 5A:
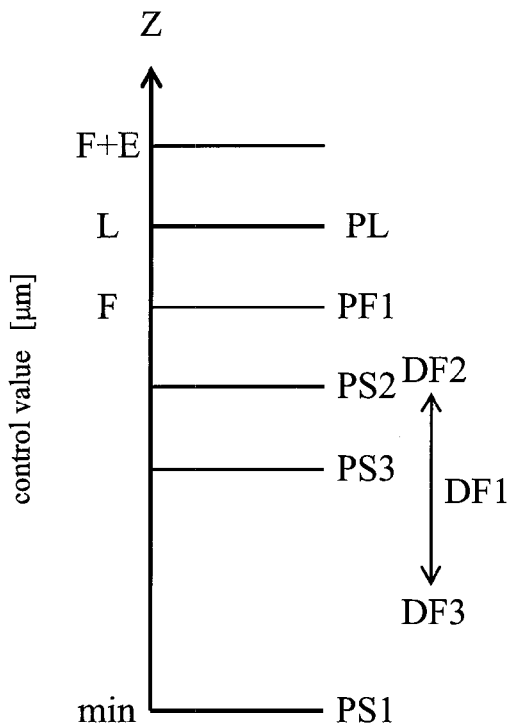
FIGS. 5A and 5B are drawings showing an example of a relation of control positions.
Figure 5B:
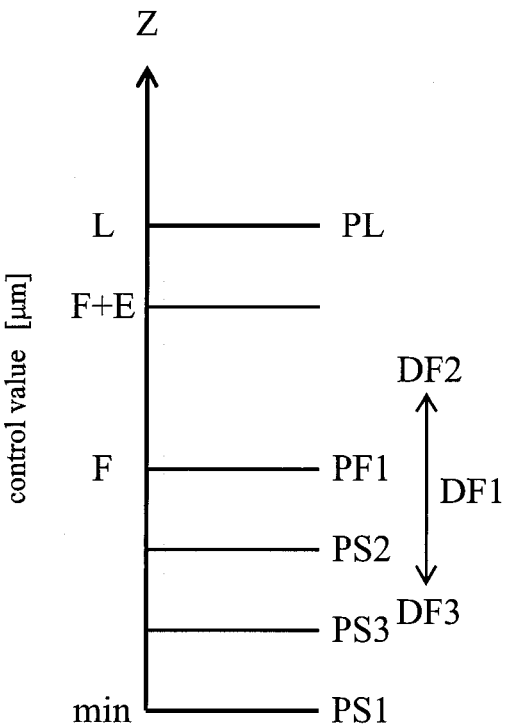
Figure 5C:
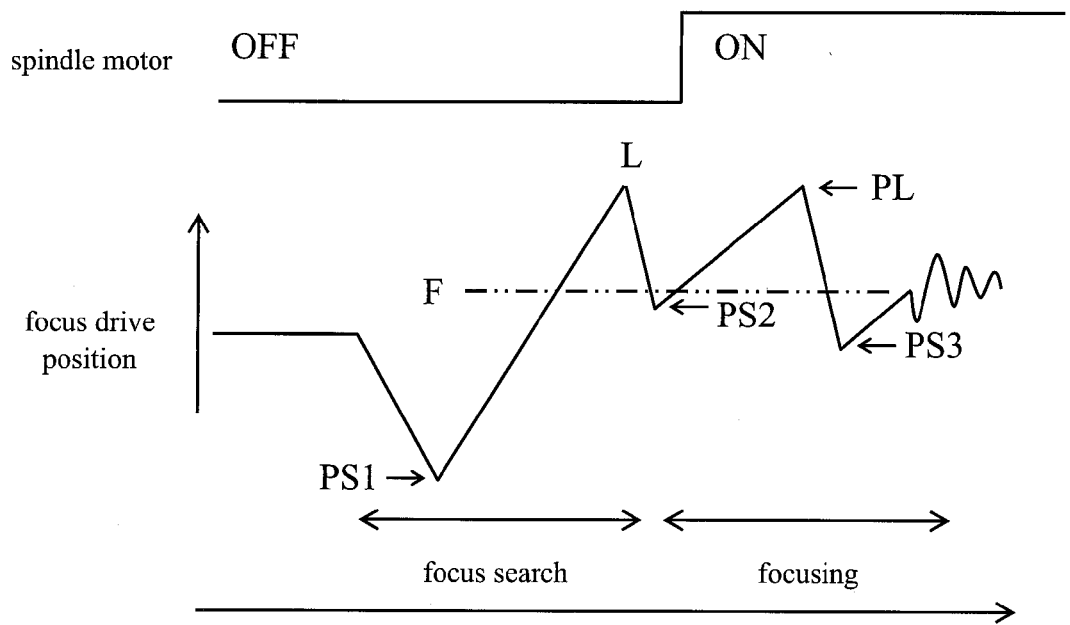
FIG. 5C is a timing chart showing an operation example of the optical disc device 100.

FIG. 4 shows the second example of the process of the control unit 20. In the second example, the processing of S202, S204 and S206 are performed instead of the processing of S108, S110 and S114 of the first example. FIGS. 5A and 5B show an example of a relation of control positions. FIG. 5C shows an operation example of the optical disc device 100. The explanation will be omitted for the same components as the first example. In the third or later example, the explanation will be omitted as well.

In S106, if the initial focus position PF1 is detected, the system controller 20 calculates the upper limit value X, which is a control value corresponding to the first end position PE1, and the lower limit value Y, which is a control value corresponding to the second separation position PS2 (S202).

$$\text{Upper limit value } X = F + k \times E \text{ [µm]} \quad (4)$$

$$\text{Lower limit value } Y = F - k \times E \text{ [µm]} \quad (5)$$

Here, "k" is a coefficient larger than 0 and equal to or smaller than 1. When performing the first processing, "k" is smaller than 1. In the example of FIG. 4, the coefficient k is specified to 0.5 in the first processing, 0.75 in the second processing, and 1.0 in the third processing.

After the values X, Y for the focusing operation are calculated, the system controller 20 drives the focus actuator 31 to make the objective lens 33 return to a separation position (control value: Y=F−K×E), which is nearer to the optical disc 1 than the first separation position PS1 (control value: min) (S204). When performing the first processing, the objective lens 33 is returned to the second separation position PS2. When performing the second processing, the objective lens 33 is returned to a third separation position PS3, which is farther from the optical disc 1 than the second separation position PS2 and nearer to the optical disc 1 than the first separation position PS1. The second processing is performed when the focus control (S116) cannot be performed by making the objective lens 33 approach to the optical disc 1, while the optical disc 1 is rotated, after the objective lens 33 is returned to the second separation position PS2.

After the optical disc 1 is rotated in S112, while the optical disc 1 is rotated, the system controller 20 tries to perform the focus control by driving the focus actuator 31 to make the objective lens 33 approach to the optical disc 1 from a separation position (control value: Y=F−k×E) (S206). When the focusing is failed, the system controller 20 performs a retry operation, for example, by returning to S202 to calculate the upper limit value X and the lower limit value Y based on a new coefficient k. As explained above, the system controller 20 tries the focus control (S116) by making the objective lens 33 approach to the optical disc 1 after the objective lens 33 is returned to the third separation position PS3, which is farther from the optical disc 1 than the second separation position PS2 and nearer to the optical disc 1 than the first separation position PS1.

Actually, the focusing succeeds in S206 unless a peculiar media (of poor quality) is used where the surface wobbling is near a border of the standard value or a peculiar optical disc device (of poor quality) is used where the mechanical surface wobbling and sensitivity variation are near a border. Therefore, the second example can further shorten a time required before performing the focus control (S116).

FIG. 5C shows an operation example of the optical disc device 100 when the peculiar media or the peculiar device is used. The example shows a situation where the focus control is failed in the first focusing, and the focus control can be succeeded in the second focusing by changing the start position of the focusing from PS2 to PS3. Therefore, even when the peculiar media or the peculiar device is used, the focus control can be performed.

Note that the focusing may be failed in the second focusing even if the start position of the focusing is changed from PS2 to PS3. In such a case, the third focusing is performed by specifying the coefficient k=1.0. Details of the control are same as the first example.

(5) Third Example

In the first example, whether the focusing is failed or not is judged when the objective lens 33 reaches the limit position PL or the end position PE1. However, if the system controller 20 tries the focus control at least for one rotation after the objective lens 33 reaches the initial focus position PF1, the objective lens 33 should necessarily reach the focus position. Thus, in the third example, when the optical disc is rotated one rotation or more after the objective lens 33 reaches the initial focus position PF1, the focusing is judged to be failed and retried.

FIG. 6 shows the third example of the process of the system controller 20. In the third example, the processing of S302 is performed instead of the processing of S114 of the first example.

After the optical disc 1 is rotated in S112, while the optical disc 1 is rotated, the system controller 20 tries the focus control by driving the focus actuator 31 to make the objective lens 33 approach to the optical disc 1 from the second separation position PS2 (S302). Here, when the objective lens 33 cannot track the focus position of the data recording layer 41 and the objective lens 33 reaches a position, which is nearer to the optical disc 1 than the initial focus position PF1 by one rotation of the optical disc 1, the system controller 20 determines that the focusing is failed and then performs a retry operation by, for example, returning to S110. Note that a timing of judging the error of the focusing can be when the objective lens 33 reaches a position, which is nearer to the optical disc 1 than the initial focus position PF1 by a distance caused by two rotations, for example. The timing of judging the error of the focusing can be a position, which is nearer to the optical disc 1 than the initial focus position PF1 by a distance equal to or more than one rotation of the optical disc, as long as the position is farther from the optical disc 1 than the limit position PL and the end position PE 1. The third example can further shorten a time required before performing the focus control.

(6) Fourth Example

Figure 8A:
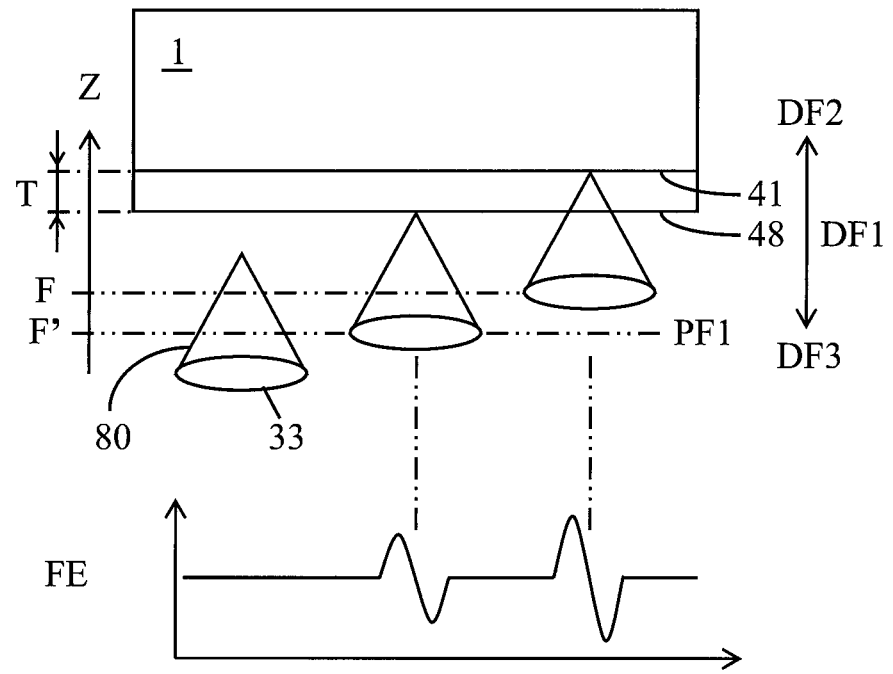
FIG. 8A is a drawing showing an example of a relation of focus positions.

Although the drive range of the focusing is determined based on the S-shaped curve of the maximum vibration amplitude of the FE signal obtained by the focus search in the first example, the drive range of the focusing can be determined based on a detection position of a surface reflection signal of the FE signal. FIG. 8A shows the FE signal when the objective lens 33 is approaching to the optical disc 1. A depth T from the disc surface 48 to the data recording layer 41 is 0.6 mm in DVD, 1.2 mm in CD, and 0.1 mm in BD Layer 0. By using the parameter T, the focus position of the data recording layer 41 can be roughly calculated from the surface reflection signal.

Figure 8B:
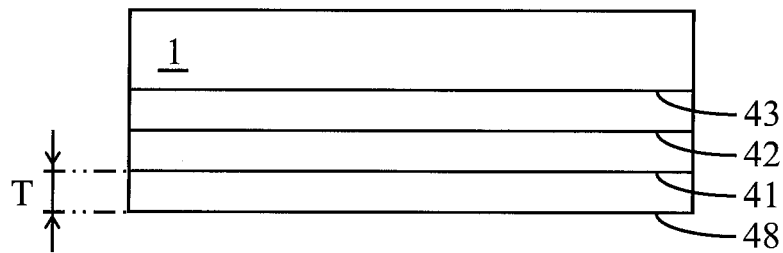
FIG. 8B is a drawing schematically showing an example of an optical disc 1 having a plurality of data recording layers.

The optical disc 1 shown in FIG. 8B has a plurality of data recording layers 41, 42, 43. Here, the optical disc 1 is specified so that the S-shaped curve based on the reflection signal from the data recording layer 41, which is the nearest to the disc surface 48, becomes the maximum vibration amplitude. Nevertheless, if the S-shaped curve based on the reflection signal from the data recording layers 42 or 43 is the maximum vibration amplitude, the focus position of the data recording layers 42 or 43 is erroneously detected to be the focus position of the data recording layer 41. In this case, if the focus position of the data recording layer 41 is calculated based on the focus position of a disc surface 48, the drive range of the focusing can be appropriately determined.

FIG. 7 shows the fourth example of the process of the system controller 20. In the fourth example, the processing of S402, S404 are performed instead of the processing of S106, S108 of the first example. The initial focus position PF1 is the focus position of the disc surface 48.

After the focus search is performed in S104, the system controller 20 judges whether or not the initial focus position PF1 (control value: F') is detected (S402). When the initial focus position PF1 is detected, the system controller 20 calculates the upper limit value X, which is a control value corresponding to the first end position PE1, and the lower limit value Y, which is a control value corresponding to the second separation position PS2 (S404). The calculated focus position of the data recording layer 41 is a position (F'+T), which is nearer to the optical disc 1 by a distant T than the initial focus position PF1 corresponding to the control value F'. Therefore, the upper limit value X and the lower limit value Y can be calculated by the following formula.

$$\text{Upper limit value } X = F' + T + E \text{ [μm]} \qquad (6)$$

$$\text{Lower limit value } Y = F' + T - E \text{ [μm]} \qquad (7)$$

After the values X, Y for the focusing operation are calculated, the system controller 20 makes the objective lens 33 return to the second separation position PS2 (control value: Y=F'+T−E), which is nearer to the optical disc 1 than the first separation position PS1 (control value: min) (S110). In S112, the spindle motor 2 is driven to rotate the optical disc 1. In S114, the system controller 20 tries the focus control by making the objective lens 33 approach to the optical disc 1 from the second separation position PS2. As described above, the system controller 20 performs the focus control (S116) while the optical disc 1 is rotated by making the objective lens 33 approach to the optical disc 1 after the objective lens 33 is returned to the second separation position PS2, which is farther from the optical disc 1 than the calculated focus position (F'+T). The calculated focus position (F'+T) is nearer to the optical disc 1 by the depth T than the initial focus position PF1.

The fourth example can provide a preferable example to shorten the time required before the focus control (S116) is started. In particular, this example is suitable when performing the focus control (S116) to the optical disc 1 having a plurality of data recording layers.

(7) Fifth Example

In the first example, the servo recovery operation in S120 is performed in the same manner as the focusing operation of S114. Since the drive range for the focusing operation can be applied to the servo recovery operation, the focusing operation can be performed in the more preferable focus drive range by changing the formula (1) to (3) in accordance with the radial direction of the servo recovery operation. Therefore, in the fifth example shown in FIG. 9, FIG. 10A, and FIG. 10B, a maximum surface wobbling value E' according to a ratio of Dnow/Dmax is used. Hereafter, the ratio of Dnow/Dmax is expressed as the ratio (Dnow/Dmax). The ratio (Dnow/Dmax) is a ratio of a current position Dnow to an outermost peripheral position Dmax=60 mm of the optical pickup 3 in the radial direction DT1 of the optical disc 1. The positions Dmax, Dnow are distances from the rotation axis of the optical disc 1. Therefore, Dmax is a distance from the rotation axis of the optical disc 1 to the outermost peripheral position of the optical pickup 3, and Dnow is a distance from the rotation axis of the optical disc 1 to the current position of the optical pickup 3.

Figure 10A:
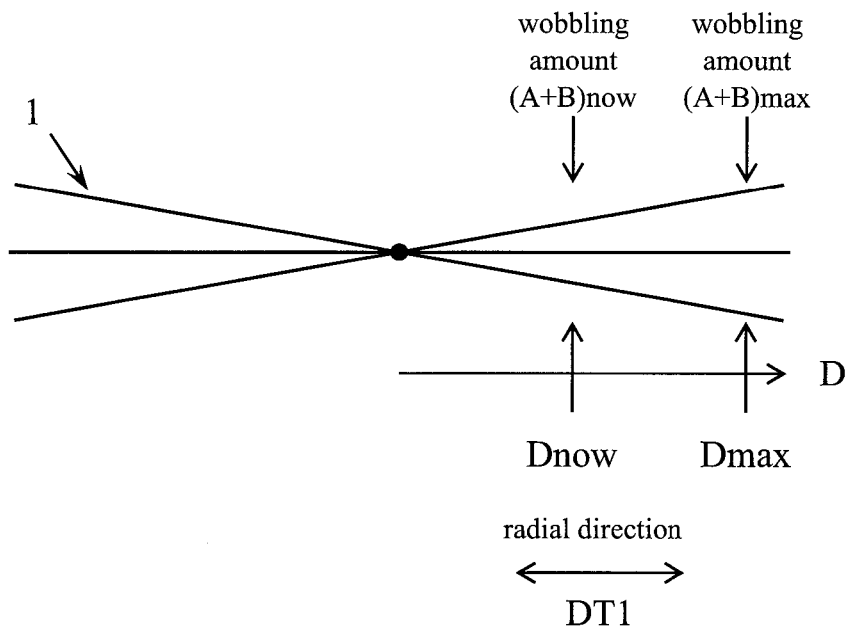
FIG. 10A is a drawing schematically showing an example of a relation between a radial direction and a wobbling amount.
Figure 10B:
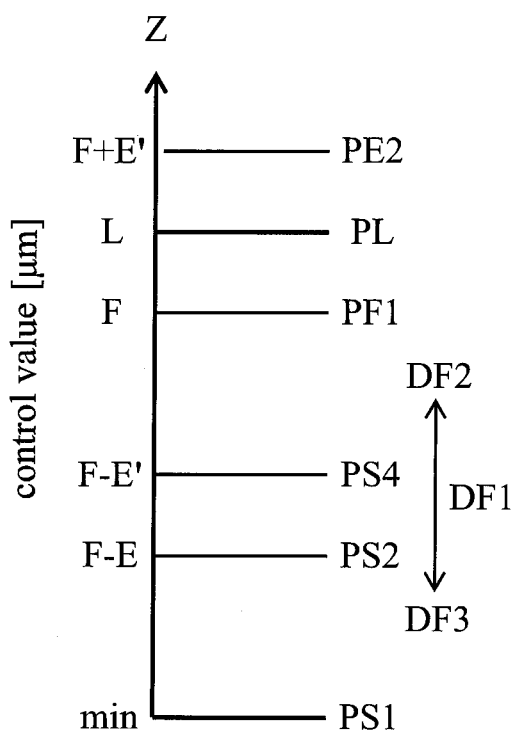
FIGS. 10B and 10C are drawings showing a relation of control positions.

FIG. 9 shows the fifth example of the process of the system controller 20. The servo recovery operation of the fifth example is performed in S120 of the first example, and performed for retrying the focus control (S116) when the focus control (S116) cannot be performed in the middle of rotating the optical disc 1. The above explanation is also applied to the sixth and later examples. FIG. 10A schematically shows an example of a relation between the radial direction and the wobbling amount. FIG. 10B shows a relation of control positions After the servo recovery operation is started, the system controller 20 obtains a current position Dnow of the optical pickup 3 in the radial direction DT1 of the optical disc 1 (S502). In S504, an upper limit value X', which is a control value corresponding to a second end position PE2, and a lower limit value Y', which is a control value corresponding to a fourth separation position PS4, are calculated.

The maximum surface wobbling value E' in the current position Dnow is shown by the following formula.

$$E'=[(A+B)\times(Dnow/Dmax)]\times 10(C/20) \, [\mu m] \quad (8)$$

The outermost peripheral position Dmax is, for example, 60 mm. Since the current position Dnow is smaller than the maximum rezero position, the following relation is satisfied.

$$E'<E$$

The values X', Y' for the focusing operation of the servo recovery operation can be calculated by the following formula using the maximum surface wobbling value E'.

$$\text{Upper limit value } X'=F+E' \, [\mu m] \quad (9)$$

$$\text{Lower limit value } Y'=F-E' \, [\mu m] \quad (10)$$

After the values X', Y' for the focusing operation are calculated, the system controller 20 drives the focus actuator 31 to make the objective lens 33 return to the fourth separation position PS4 (control value: Y'=F−E'), which is nearer to the optical disc 1 than the second separation position PS2 (control value: Y=F−E) (S506). In S508, while the optical disc 1 is rotated, the system controller 20 tries the focus control by driving the focus actuator 31 to make the objective lens 33 approach to the optical disc 1 from the fourth separation position PS4. When the objective lens 33 cannot track the focus position of the data recording layer 41 and the objective lens 33 reaches the limit position PL or the second end position PE2, the system controller 20 determines that the focusing is failed and then performs a retry operation by, for example, returning to S506. As described above, the system controller 20 tries the focus control (S116) by making the objective lens 33 approach to the optical disc 1 after the objective lens 33 is returned to the position PS4, which is nearer to the optical disc 1 than the second separation position PS2 according to the ratio (Dnow/Dmax).

As explained above, the fifth example can shorten a time required for the servo recovery operation because the drive range of the focus actuator 31 can be reduced when performing the servo recovery operation.

(8) Sixth Example

When performing the servo recovery operation, the wobbling amount can be determined by a level of a low-frequency signal, which can be obtained from the drive signal of the focus actuator 31 when the focus servo is enabled. The drive signal of the focus actuator 31 is a signal showing a position of the objective lens 33 in the focal direction. By changing the above formula (1) to (3) using the wobbling amount obtained from the drive signal, the focusing operation can be performed in more appropriate focus drive range. Therefore, in the sixth example shown in FIG. 10C and FIG. 11, the wobbling amount (A+B) now of the optical disc 1 at the current position Dnow of the optical pickup 3 in the radial direction DT1 of the optical disc 1 is obtained.

Figure 10C:
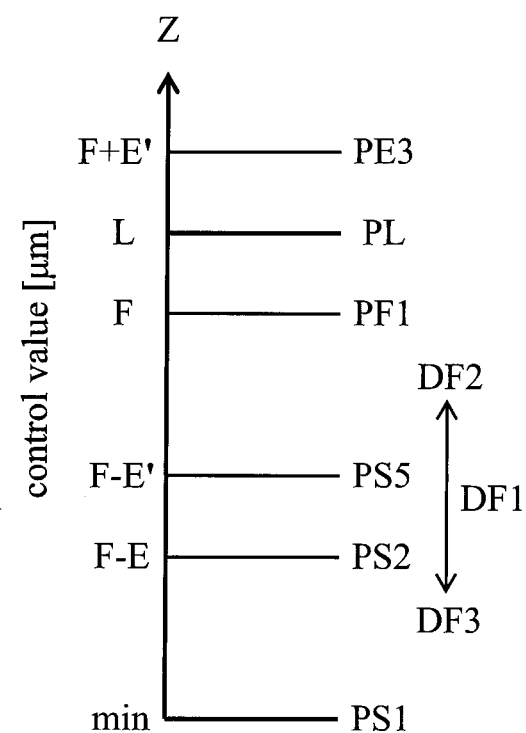

FIG. 11 shows the sixth example of the process of the system controller 20. Before the system controller 20 begins the process, a current wobbling amount (A+B)now is repeatedly calculated from the drive signal of the focus actuator 31 during the focus control of S116 (shown in FIG. 2). FIG. 10C shows an example of a relation of control positions. If the lower limit position and the upper limit position during when the optical disc 1 is rotated for one rotation are calculated from the drive signal of the focus actuator 31, a width between these positions is the current wobbling amount (A+B)now. The current wobbling amount (A+B)now in this case is the wobbling amount of the current track.

After the servo recovery operation is started, the system controller 20 obtains the current wobbling amount (A+B)now, which is calculated during the focus control operation (S602). In S604, the upper limit value X', which is corresponding to a third end position PE3, and the lower limit value Y', which is corresponding to a fifth separation position PS5, are calculated.

The maximum surface wobbling value E' using the current wobbling amount (A+B)now is shown by the following formula.

$$E'=(A+B)\text{now}\times 10(C/20) \, [\mu m] \quad (11)$$

Since the current wobbling amount (A+B)now is already determined, a current radial direction Dnow is not required for calculating the maximum surface wobbling value E'. Since the current wobbling amount (A+B)now is an actual measurement value, the following relation is satisfied.

$$E'<E$$

The values X', Y' for the focusing operation of the servo recovery operation can be calculated by the following formula using the maximum surface wobbling value E'.

$$\text{Upper limit value } X'=F+E' \, [\mu m] \quad (12)$$

$$\text{Lower limit value } Y'=F-E' \, [\mu m] \quad (13)$$

After the values X', Y' for the focusing operation are calculated, the system controller 20 drives the focus actuator 31 to make the objective lens 33 return to the fifth separation position PS5 (control value: Y'=F−E'), which is nearer to the optical disc 1 than the second separation position PS2 (control value: Y=F−E) (S606). In S608, while the optical disc 1 is rotated, the system controller 20 tries the focus control by driving the focus actuator 31 to make the objective lens 33 approach to the optical disc 1 from the fifth separation position PS5. When the objective lens 33 cannot track the focus position of the data recording layer 41 and the objective lens 33 reaches the limit position PL or the third end position PE3, the system controller 20 determines that the focusing is failed and then performs a retry operation by, for example, returning to S606. As explained above, the system controller 20 tries the focus control (S116) by making the objective lens 33 approach to the optical disc 1 after the objective lens 33 is returned to a position PS5, which is a position determined according to the current wobbling amount (A+B)now.

As explained above, the sixth example can shorten a time required for the servo recovery because the drive range of the focus actuator 31 can be reduced when performing the servo recovery operation.

(9) Seventh Example

Even when the current wobbling amount (A+B)now is not determined, the current wobbling amount (A+B)now can be calculated from the wobbling amount (A+B)max of the optical disc 1 at the outermost peripheral position Dmax of the optical pickup 3 and the current radial direction Dnow. The focusing operation can be performed in more appropriate focus drive range by changing the above formula (1) to (3) using the wobbling amount (A+B)max of the outermost peripheral surface and the current radial direction Dnow. Therefore, in the seventh example shown in FIG. 12, the wobbling amount (A+B)max of outermost peripheral surface is obtained.

FIG. 12 shows the seventh example of the process of the system controller 20. Before the system controller 20 begins the process, the wobbling amount (A+B)max at the outermost peripheral position Dmax is calculated from the drive signal of the focus actuator 31 during the first focus control of S116 (shown in FIG. 2).

After the servo recovery operation is started, the system controller 20 obtains the wobbling amount (A+B)max of outermost peripheral surface, which is calculated during the focus control operation (S702). In S704, the current position Dnow of the optical pickup 3 in the radial direction DT1 of the optical disc 1 is obtained. In S706, the upper limit value X', which is corresponding to a fourth end position PE4, and the lower limit value Y', which is corresponding to a sixth separation position PS6 are calculated.

The maximum surface wobbling value E' using the wobbling amount (A+B)max of outermost peripheral surface and the current position Dnow is shown by the following formula.

$$E'=[(A+B)\max \times (D\text{now}/D\max)] \times 10(C/20) \; [\mu m] \quad (14)$$

The outermost peripheral position Dmax is, for example, 60 mm. Since the wobbling amount (A+B)max of outermost peripheral surface is an actual measurement value and the current position Dnow is smaller than the maximum rezero position, the following relation is satisfied.

$$E'<E$$

The values X', Y' for the focusing operation of the servo recovery operation can be calculated by the following formula using the maximum surface wobbling value E'.

$$\text{Upper limit value } X'=F+E' \; [\mu m] \quad (15)$$

$$\text{Lower limit value } Y'=F-E' \; [\mu m] \quad (16)$$

After the values X', Y' for the focusing operation are calculated, the system controller 20 drives the focus actuator 31 to make the objective lens 33 return to the sixth separation position PS6 (control value: Y'=F−E'), which is nearer to the optical disc 1 than the second separation position PS2 (control value: Y=F−E) (S708). In S710, while the optical disc 1 is rotated, the system controller 20 tries the focus control by driving the focus actuator 31 to make the objective lens 33 approach to the optical disc 1 from the sixth separation position PS6. When the objective lens 33 cannot track the focus position of the data recording layer 41 and the objective lens 33 reaches the limit position PL or the fourth end position PE4, the system controller 20 determines that the focusing is failed and then performs a retry operation by, for example, returning to S708. As explained above, the system controller 20 tries the focus control (S116) by making the objective lens 33 approach to the optical disc 1 after the objective lens 33 is returned to a position PS6 according to the multiplication value between the ratio (Dnow/Dmax) and the wobbling amount (A+B)max.

As explained above, the seventh example can shorten a time required for the servo recovery operation because the drive range of the focus actuator 31 can be reduced when performing the servo recovery operation.

(10) Eighth Example

An average value of the focus position of the data recording layer 41 can be determined from a focus drive average value, which can be obtained from the drive signal of the focus actuator 31 when the focus servo is enabled. For example, same as when calculating the current wobbling amount (A+B)now, the focus drive average value can be specified from the drive signal of the focus actuator 31 by an intermediate value between the lower limit position and the upper limit position during when the optical disc 1 is rotated for one rotation. Otherwise, the focus drive average value can be specified by an average height during when the optical disc 1 is rotated for one rotation. As explained above, the average value includes a value calculated by a substantially similar formula such as an intermediate value.

By changing the above formula (1) to (3) using the average value of the focus position, the focusing operation can be performed in more appropriate focus drive range. Therefore, in the eighth example shown in FIG. 13, the average focus position Fave of the data recording layer 41 is obtained during the focus control (S116).

FIG. 13 shows the eighth example of the process of the system controller 20. Before the system controller 20 begins the process, the average focus position Fave is calculated from the drive signal of the focus actuator 31 during the focus control of S116 (shown in FIG. 2).

After the servo recovery operation is started, the system controller 20 obtains the average focus position Fave, which is calculated during the focus control operation (S802). In S804, the upper limit value X', which is corresponding to a fifth end position PE5, and the lower limit value Y', which is corresponding to a seventh separation position PS7 are calculated.

$$\text{Upper limit value } X'=F\text{ave}+E \; [\mu m] \quad (17)$$

$$\text{Lower limit value } Y'=F\text{ave}-E \; [\mu m] \quad (18)$$

After the values X', Y' for the focusing operation are calculated, the system controller 20 drives the focus actuator 31 to make the objective lens 33 return to the seventh separation position PS7 (control value: Y'=Fave−E) (S806). In S808, while the optical disc 1 is rotated, the system controller 20 tries the focus control by driving the focus actuator 31 to make the objective lens 33 approach to the optical disc 1 from the seventh separation position PS7. When the objective lens 33 cannot track the focus position of the data recording layer 41 and the objective lens 33 reaches the limit position PL or the fifth end position PE5, the system controller 20 determines that the focusing is failed and then performs a retry operation by, for example, returning to S806. As explained above, the system controller 20 tries the focus control (S116) by making the objective lens 33 approach to the optical disc 1 after the objective lens 33 is returned to a position PS7, which is farther from the optical disc by a predetermined distance E than the average focus position Fave.

As explained above, the eighth example can provide an example of more preferable servo recovery operation (S120).

(11) Ninth Example

The above explained examples can be arbitrarily combined. For example, if all of the servo recovery operations shown in the example 5, the example 7 and the example 8 are considered, the focusing operation can be performed in further more appropriate focus drive range.

FIG. 14 shows the ninth example of the process of the system controller 20. Before the system controller 20 begins the process, the wobbling amount (A+B)max of outermost peripheral surface is calculated from the drive signal of the focus actuator 31 during the first focus control of S116 (shown in FIG. 2). In addition, the average focus position Fave of the data recording layer 41 is calculated from the drive signal of the focus actuator 31 during the focus control in S116.

After the servo recovery operation is started, the system controller 20 obtains the wobbling amount (A+B)max of outermost peripheral surface, which is calculated during the focus control operation (S902). In S904, the current position Dnow of the optical pickup 3 in the radial direction DT1 of the optical disc 1 is obtained. In S906, the average focus position Fave, which is calculated during the focus control, is obtained. In S908, the upper limit value X', which is corresponding to a sixth end position PE6, and the lower limit value Y', which is corresponding to an eighth separation position PS8, are calculated.

The maximum surface wobbling value E' using the wobbling amount (A+B)max of outermost peripheral surface and the current position Dnow is shown by the following formula.

$$E'=[(A+B)\text{max}\times(D\text{now}/D\text{max})]\times 10(C/20) \text{ [µm]} \quad (19)$$

The outermost peripheral position Dmax is, for example, 60 mm. Since the wobbling amount (A+B)max of outermost peripheral surface is an actual measurement value and the current position Dnow is smaller than the maximum rezero position, the following relation is satisfied.

$$E'<E$$

The values X', Y' for the focusing operation of the servo recovery operation can be calculated by the following formula using the maximum surface wobbling value E' and the average focus position Fave.

$$\text{Upper limit value } X'=F\text{ave}+E' \text{ [µm]} \quad (20)$$

$$\text{Lower limit value } Y'=F\text{ave}-E' \text{ [µm]} \quad (21)$$

After the values X', Y' for the focusing operation are calculated, the system controller 20 drives the focus actuator 31 to make the objective lens 33 return to the eighth separation position PS8 (control value: Y'=Fave−E'), which is nearer to the optical disc 1 than the second separation position PS2 (control value: Y=F−E) (S910). In S912, while the optical disc 1 is rotated, the system controller 20 tries the focus control by driving the focus actuator 31 to make the objective lens 33 approach to the optical disc 1 from the eighth separation position PS8. When the objective lens 33 cannot track the focus position of the data recording layer 41 and the objective lens 33 reaches the limit position PL or the sixth end position PE6, the system controller 20 determines that the focusing is failed and then performs a retry operation by, for example, returning to S910. As explained above, the system controller 20 tries the focus control (S116) by making the objective lens 33 approach to the optical disc 1 after the objective lens 33 is returned to a position PS8, which is farther from the optical disc by a predetermined distance E' than the average focus position Faye.

As explained above, the ninth example can shorten a time required for the servo recovery operation because the drive range of the focus actuator 31 can be reduced when performing the servo recovery operation.

(12) Other Variation Examples

An order of the steps in the above described processes can be arbitrarily changed. For example, in the process of FIG. 2, the optical disc can be driven to be rotated in S112 before the objective lens 33 is returned to the second separation position PS2 in S110.

(13) Conclusion

As explained above, by using various embodiments of the present invention, a technology to shorten a time required before performing the focus control can be provided. Of course, the above-described basic operation and effect can be obtained even with the components having only the features set forth in the independent claims.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

What is claimed is:

1. An optical disc device, comprising:
a spindle motor that rotates an optical disc having a data recording layer;
an optical pickup that has an objective lens to focus a light beam on the optical disc;
an actuator that moves the objective lens in a focal direction approaching to the data recording layer and separating from the data recording layer;
an initial focus position detecting unit that detects an initial focus position, while the optical disc is not rotated, by making the objective lens approach to the optical disc from a first separation position, which is farther from the optical disc than a focus position; and
a focus control unit that performs a focus control so that the objective lens tracks the focus position of the data recording layer, while the optical disc is rotated, by making the objective lens approach to the optical disc after the objective lens is returned to a second separation position, which is nearer to the optical disc than the first separation position.

2. The optical disc device according to claim 1, wherein
the initial focus position is the focus position of the data recording layer, and
the second separation position is a position farther from the optical disc by a predetermined distance than the initial focus position.

3. The optical disc device according to claim 1, wherein
the initial focus position is the focus position of the data recording layer, and
when the focus control unit cannot perform the focus control, while the optical disc is rotated, by making the objective lens approach to the optical disc after the objective lens is returned to the second separation position and the objective lens reaches a position nearer to the optical disc by a predetermined distance than the initial focus position, the focus control unit performs the focus control so that the objective lens tracks the focus position of the data recording layer by making the objective lens approach to the optical disc after the objective lens is returned to a position farther from the optical disc than the initial focus position.

4. The optical disc device according to claim 1, wherein
when the focus control unit cannot perform the focus control, while the optical disc is rotated, by making the objective lens approach to the optical disc after the objective lens is returned to the second separation position, the focus control unit performs the focus control so that the objective lens tracks the focus position of the data recording layer by making the objective lens approach to the optical disc after the objective lens is returned to a third separation position, which is farther from the optical disc than the second separation position and nearer to the optical disc than the first separation position.

5. The optical disc device according to claim 1, wherein
when the focus control unit cannot perform the focus control, while the optical disc is rotated, by making the objective lens approach to the optical disc after the objective lens is returned to the second separation position and the objective lens reaches a position nearer to the optical disc than the initial focus position by a distance equal to or more than one rotation of the optical disc, the focus control unit performs the focus control so that the objective lens tracks the focus position of the data recording layer by making the objective lens approach to the optical disc after the objective lens is returned to a position farther from the optical disc than the initial focus position.

6. The optical disc device according to claim 1, wherein
the initial focus position is a focus position of a disc surface of the data recording layer,
when a depth of the data recording layer from the disc surface of the optical disc is defined as T, the focus control unit performs the focus control, while the optical disc is rotated, by making the objective lens approach to the optical disc after the objective lens is returned to the second separation position, which is farther from the optical disc than a calculated focus position, and
the calculated focus position is nearer by the depth T from the optical disc than the initial focus position.

7. The optical disc device according to claim 1, wherein
when the focus control unit cannot perform the focus control in the middle of rotating the optical disc, the focus control unit performs the focus control so that the objective lens tracks the focus position of the data recording layer by making the objective lens approach to the optical disc after the objective lens is returned to a position, which is nearer to the optical disc than the second separation position and determined according to a ratio of Dnow/Dmax, and
the ratio of Dnow/Dmax is a ratio of a current position Dnow to an outermost peripheral position Dmax of the optical pickup in a radial direction of the optical disc.

8. The optical disc device according to claim 1, wherein
the focus control unit obtains a wobbling amount of the optical disc at a current position of the optical pickup in a radial direction of the optical disc,
when the focus control cannot be performed in the middle of rotating the optical disc, the focus control unit performs the focus control so that the objective lens tracks the focus position of the data recording layer by making the objective lens approach to the optical disc after the objective lens is returned to a position, which is determined according to the wobbling amount.

9. The optical disc device according to claim 1, wherein
the focus control unit obtains a wobbling amount of the optical disc at an outermost peripheral position of the optical pickup,
when the focus control cannot be performed in the middle of rotating the optical disc, the focus control unit performs the focus control so that the objective lens tracks the focus position of the data recording layer by making the objective lens approach to the optical disc after the objective lens is returned to a position, which is determined according to a multiplication value between a ratio of Dnow/Dmax and the wobbling amount, and the ratio of Dnow/Dmax is a ratio of a current position Dnow to an outermost peripheral position Dmax of the optical pickup in a radial direction of the optical disc.

10. The optical disc device according to claim 1, wherein
the focus control unit obtains an average focus position during the focus control, and
when the focus control cannot be performed in the middle of rotating the optical disc, the focus control unit performs the focus control so that the objective lens tracks the focus position of the data recording layer by making the objective lens approach to the optical disc after the objective lens is returned to a position farther from the optical disc by a predetermined distance than the average focus position.

11. A focus control method of an optical disc device,
the optical disc device comprising:
a spindle motor that rotates an optical disc having a data recording layer;
an optical pickup that has an objective lens to focus a light beam on the optical disc; and
an actuator that moves the objective lens in a focal direction approaching to the data recording layer and separating from the data recording layer, the method comprising the steps of:
detecting an initial focus position, while the optical disc is not rotated, by making the objective lens approach to the optical disc from a first separation position, which is farther from the optical disc than a focus position; and
performing a focus control so that the objective lens tracks the focus position of the data recording layer, while the optical disc is rotated, by making the objective lens approach to the optical disc after the objective lens is returned to a second separation position, which is nearer to the optical disc than the first separation position.

* * * * *